US009501585B1

(12) United States Patent
Gautam et al.

(10) Patent No.: US 9,501,585 B1
(45) Date of Patent: Nov. 22, 2016

(54) METHODS AND SYSTEM FOR PROVIDING REAL-TIME BUSINESS INTELLIGENCE USING SEARCH-BASED ANALYTICS ENGINE

(71) Applicant: DataRPM Corporation, Fairfax, VA (US)

(72) Inventors: Shyamantak Gautam, Bangalore (IN); Ruban Phukan, Bangalore (IN); Sundeep Sanghavi, Fairfax, VA (US); Vishal Katkar, Salcete Goa. (IN)

(73) Assignee: DataRPM Corporation, Fairfax, VA (US)

( * ) Notice: Subject to any disclaimer, the term of this patent is extended or adjusted under 35 U.S.C. 154(b) by 0 days.

(21) Appl. No.: 14/304,490

(22) Filed: Jun. 13, 2014

Related U.S. Application Data

(60) Provisional application No. 61/834,608, filed on Jun. 13, 2013.

(51) Int. Cl.
*G06F 17/30* (2006.01)
(52) U.S. Cl.
CPC .............. *G06F 17/30991* (2013.01)
(58) Field of Classification Search
CPC ............. Y10S 707/99935; Y10S 707/99934; Y10S 707/99939; G06F 17/30477; G06F 17/30401; G06F 17/30427; G06F 17/30448
See application file for complete search history.

(56) References Cited

U.S. PATENT DOCUMENTS

| 5,809,499 | A | 9/1998 | Wong et al. |
| 6,101,491 | A * | 8/2000 | Woods .............. G06F 17/30011 707/696 |
| 7,548,909 | B2 | 6/2009 | Rappaport et al. |
| 7,606,805 | B2 | 10/2009 | Harris |
| 7,606,835 | B2 | 10/2009 | Laaser et al. |
| 7,716,174 | B2 | 5/2010 | Lee et al. |

(Continued)

OTHER PUBLICATIONS

Sun et al. "Articulate: A Semi-automated Model for Translating Natural Language Queries into Meaningful Visualizations" [online], Tretrieved from the internet: <URL: http://link.springer.com/chater/10.1007%2F978-3-642-13544-6_18#page-1>, 2010.

(Continued)

*Primary Examiner* — Sangwoo Ahn
(74) *Attorney, Agent, or Firm* — Cooley LLP

(57) ABSTRACT

The methods and systems for providing real-time business intelligence using search-based analytics engine facilitate a user to input a natural language query with regard to business analytics and obtain an analytics report in response without the user aggregating or processing raw data from a database query. Such business intelligence platform may receive a data analytics request including a user-desired data variable via a user interface; receive, via the user interface, user-configured parameters identifying a user-selected data source and a user-defined data set; form the user-defined data set based on user-configured parameters; query the user-defined data set to obtain a query result of the user-desired data variable; and generate a user interactive graphical representation of the query result of user-desired data variable.

22 Claims, 20 Drawing Sheets

(56) References Cited

U.S. PATENT DOCUMENTS

| | | | |
|---|---|---|---|
| 7,953,762 | B2 | 5/2011 | Agrawal et al. |
| 8,006,197 | B1 | 8/2011 | Nevill-Manning et al. |
| 8,370,352 | B2 | 2/2013 | Lita et al. |
| 8,370,375 | B2 | 2/2013 | Dettinger et al. |
| 8,386,456 | B1 | 2/2013 | Paiz |
| 8,396,859 | B2 | 3/2013 | Green et al. |
| 8,606,739 | B2 | 12/2013 | Apacible et al. |
| 2002/0049747 | A1* | 4/2002 | Inohara et al. ... G06F 17/30557 |
| 2004/0088158 | A1* | 5/2004 | Sheu et al. ............ 704/9 |
| 2005/0149496 | A1 | 7/2005 | Mukherjee et al. |
| 2008/0071772 | A1 | 3/2008 | Rosenoff et al. |
| 2008/0235199 | A1 | 9/2008 | Li et al. |
| 2010/0063981 | A1 | 3/2010 | Thomsen et al. |
| 2011/0035744 | A1* | 2/2011 | Bhatia ............ 717/174 |
| 2011/0191361 | A1 | 8/2011 | Gupta et al. |
| 2011/0246439 | A1* | 10/2011 | Isard .............. G06F 17/30864 707/706 |
| 2011/0270829 | A1 | 11/2011 | Xie et al. |
| 2012/0047164 | A1* | 2/2012 | Saadat ............ G06F 17/30321 707/769 |
| 2012/0226676 | A1 | 9/2012 | Kasterstein et al. |
| 2012/0254143 | A1 | 10/2012 | Varma et al. |
| 2013/0013329 | A1* | 1/2013 | Brogan et al. ............ 705/2 |
| 2013/0103677 | A1 | 4/2013 | Chakra et al. |
| 2014/0095505 | A1* | 4/2014 | Blanchflower ... G06F 17/30091 707/737 |
| 2014/0122455 | A1 | 5/2014 | Leitner et al. |

OTHER PUBLICATIONS

Wiza et al. "Periscope —A System for Adaptive 3D Visualization of Search Results" [online], Retrieved from the internet: <URL: http://dl.acm.org/citation.cfm?id+9855045>, 2004.

Office Action for U.S Appl. No. 14/304,487 dated Aug. 22, 2014.

Office Action for U.S Appl. No. 14/304,487 dated May 14, 2015.

Office Action for U.S Appl. No. 14/304,487 dated Apr. 14, 2016.

* cited by examiner

US 9,501,585 B1

METHODS AND SYSTEM FOR PROVIDING REAL-TIME BUSINESS INTELLIGENCE USING SEARCH-BASED ANALYTICS ENGINE

PRIORITY CLAIM

This application is a non-provisional of and claims priority under 35 U.S.C. §119 to U.S. Provisional Application No. 61/834,608, filed on Jun. 13, 2013, entitled "Methods and System for Providing Real-Time Business Intelligence Using Search Engines Based On Natural Language Queries."

This application is related to co-pending U.S. Non-Provisional application Ser. No. 14/304,487, filed on the same day herewith, entitled "Methods And System For Providing Real-Time Business Intelligence Using Natural Language Queries."

The aforementioned applications are all herein expressly incorporated by reference.

FIELD

Some embodiments described herein generally address apparatuses, methods, and systems for intelligent data analytics, and more particularly, include methods and system for providing real-time business intelligence using search based Analytics Engine.

BACKGROUND

Known data analysis and business intelligence systems use data warehouses and/or build Online Analytical Processing (OLAP) cubes for pre-computing business data in search of business intelligence. The data in a data warehouse is generally queried using database development structured programming languages such as Structured Query Language (SQL). A user such as a database administrator typically inputs a SQL query into the business data warehouse, and in turn receives the query results in a SQL format. Upon obtaining the query results, the user can compile the query results to generate business intelligence reports, by utilizing a document processing tool such as Microsoft Word or PowerPoint to generate data charts and data plots to graphically illustrate the query results.

SUMMARY

Some embodiments described herein relate generally to providing real-time data analysis, reporting and business intelligence related to data stored in various sources, and more particularly, to providing real-time business intelligence to users, irrespective of users' technical knowledge, using natural language interfaces.

In some embodiments, methods and system provide a substantially real-time statistical analysis and computation engine developed based on search engine technology to store and access data in index files without using data warehouses that store data in databases. The methods and system also provide a natural language and search based interface to analyze data and generate reports without a need for writing SQL queries or using software configurations for creating reports.

DETAILED DESCRIPTION

Figure 1A:
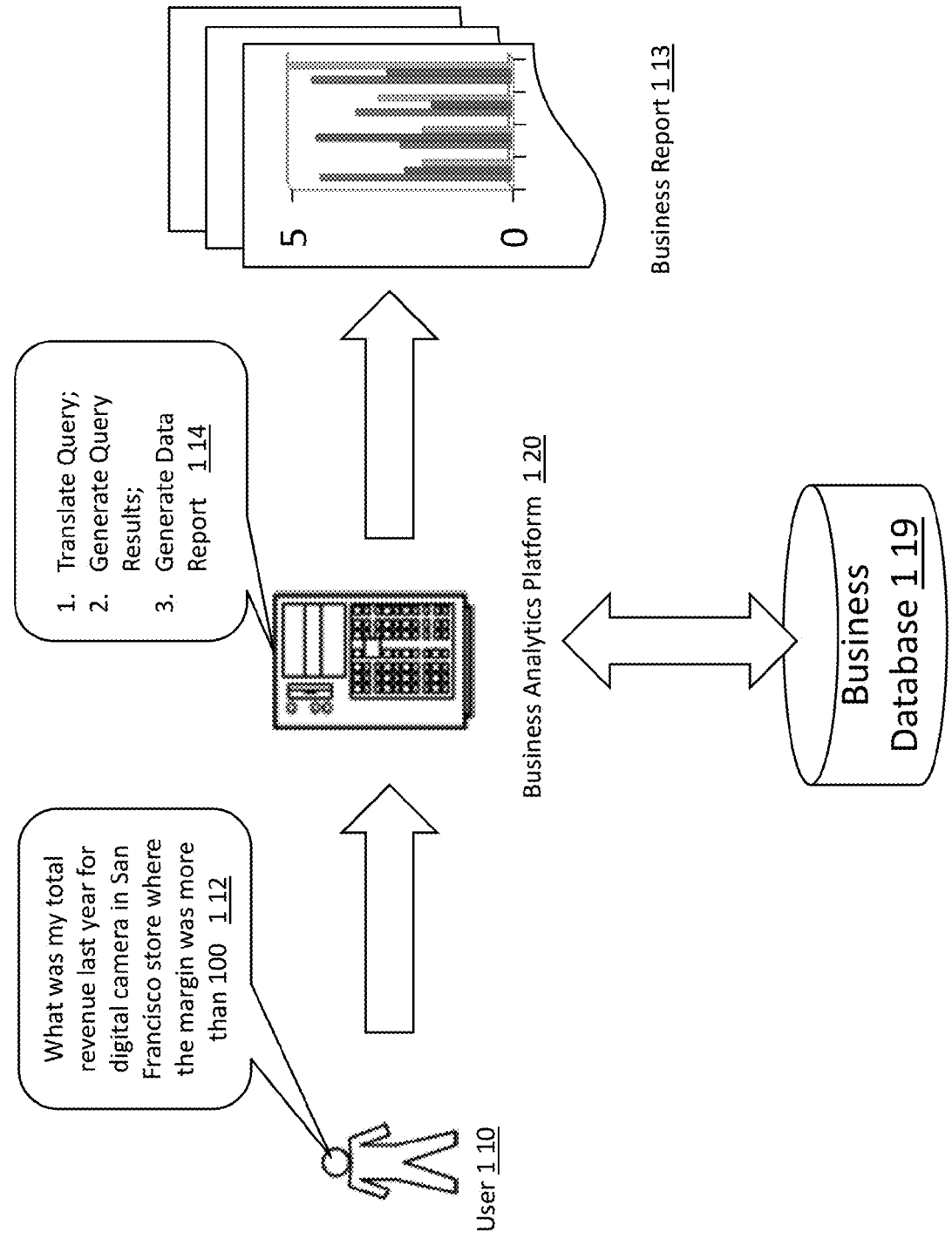
FIG. 1A is a schematic block diagram illustrating one example of interactive input and output between a user and a business intelligence platform, according to an embodiment.

A real-time business intelligence platform using search engine based database queries allows a user to obtain business analytics reports by submitting a natural language based question via a user interface, without manually aggregating raw data from a database query. For example, a user may input a question in a natural language via a user interface (e.g., see 501 in FIG. 5) by either manually typing the question, or speaking the question via a microphone, and/or the like. The user may optionally configure data sources and/or data sets for the query via a user interface (e.g., see FIGS. 4B-4D) so as to define the scope of data queries. A natural language processing module (e.g., see 201 in FIG. 2) may process the natural-language-based question, and translate the question into a database query in the format of a structured database language, such as SQL, and/or the like. The generated query may be used by a search engine controlled module (e.g., see 205 in FIG. 2) to query a database (e.g., see 303 in FIG. 3A) for the desired data. In one implementation, the business intelligence platform enables data discovery and business intelligence from disparate data sources where the sources in themselves may be non-relational in nature, with variable data structures or schema and may include metadata structural information that is not readily available. These include sources like Hadoop or NoSQL data, log files, machine data and others. In one implementation, the business intelligence platform analyzes a context of the natural language query based the data obtained from various data sources, and on structural information obtained from the natural language question.

In one implementation, the business intelligence platform indexes data from disparate sources into a computation search engine designed for real-time ad-hoc multi-dimensional analysis. The search engine may be used as an underlying data storage that enables fast multi-dimensional lookups in real-time, which enables real-time processing of a natural language question using cross functional-dependency algorithms without a time lapse.

Introduction of statistical analysis engines based on the search engine technology in the field of data analytics and business intelligence provides various benefits over typical data warehouse approaches to statistical data analysis and reporting. Some example disadvantages of using data warehouses include, ability to only support pre-configured analysis methods such as using static formats for dashboards, reports and slice-dice and drill down capabilities, long deployment cycle for design and implementation of data warehouses, inflexibility of data warehouses for supporting ad-hoc changes to data because of the fixed schema of databases, regular maintenance hassles associated with databases for optimal performance, and performance and scalability issues in handling high volumes of data.

Search engine technology provides data indexing from a data source in a de-normalized schema-free way. The search engine technology using indexed data enables ad-hoc data analysis and rapid deployment, because the deployment does not require a specific design. In addition, search engine technology provides flexibility to handle dynamic changes in data, as individual records are stored as columnar key value pairs. Furthermore, scalability and fast access to the data, even for high volumes, can be provided with minimal maintenance. A higher storage level security than databases can be provided because the data can be stored in distributed binary index files. In addition, the data is not query-able by any other methods except through a provided query engine.

Known text or content based search engine technology, however, does not natively render itself for analytics and business intelligence use. Therefore, a need exists for a computational data search engine technology that incorporates statistical analysis, mathematical and logical computation engines, and visual transformation and rendering, to function based on search engine technology to support comprehensive data analysis capabilities. The computational data search engine, can be a search engine technology infused with statistical aggregation and a data analysis engine that operates on search index files, in the field of data analytics and business intelligence, providing various benefits over typical data warehouse approaches to statistical data analysis and reporting. More generally, such a computational engine can be based on, for example, statistical, logical, mathematical, heuristics and/or algorithmic calculations.

Often, data analysis is mainly accessible to users with technical skills or to business intelligence experts because data analysis is based on either writing code or using complex software interfaces to query and visualize data and reports. In some embodiments, a business intelligence platform provides data analysis capabilities to a user irrespective of the user's technology or business intelligence skills by providing a simple natural-language-based question-and-answer system and a computational search-based interface to ask questions or to perform search and data analysis and receive reports. For example, the business intelligence platform can use index files based on computational data search engine technology. Such a platform can provide natural language and search-based interfaces to analyze data and generate reports substantially in real-time without requiring a user to write queries in a query language (e.g., SQL) or use software configurations for generating reports.

In some embodiments, the business intelligence platform can provide data, data analysis, and reports to the user substantially in real-time without having to customize data beforehand. The business intelligence platform also provides a natural language processing engine that translates user questions and queries into appropriate analytics queries and then maps the results using a rule engine to appropriate visualization modules.

As used herein, the singular forms "a," "an" and "the" include plural referents unless the context clearly dictates otherwise. Thus, for example, the term "a "data analysis" is intended to mean a single data analysis or a combination of data analyses (e.g., data analyses associated with a series of applications, services, locations, products, etc.)

FIG. 1A is a schematic block diagram illustrating one example of interactive input and output between a user and a business analytics platform, according to an embodiment. In one embodiment, a user 110 may desire to obtain business analytics data, e.g., the user may wonder what was the total revenue last year for digital camera in San Francisco store where the margin was more than 100 at 112. The user 110 may not need to be adept in database technologies or any structured programming language such as SQL, etc. The user 110 may submit the total revenue question in natural language at 112 via a user interface of a business intelligence platform 120. Upon receiving the natural language question 112, the business intelligence platform 120 can translate the natural language into a query in a structured language, and perform a query on a business database 119 for business data so that the business intelligence platform 120 can automatically aggregate the query results and generate a business analytics report including graphical representations of the query results, at 114. In one implementation, the user 110 may not need to process and/or compile any raw data from the database, but can receive an analytics report 113 as an output of the business intelligence platform 120.

Figure 1B:
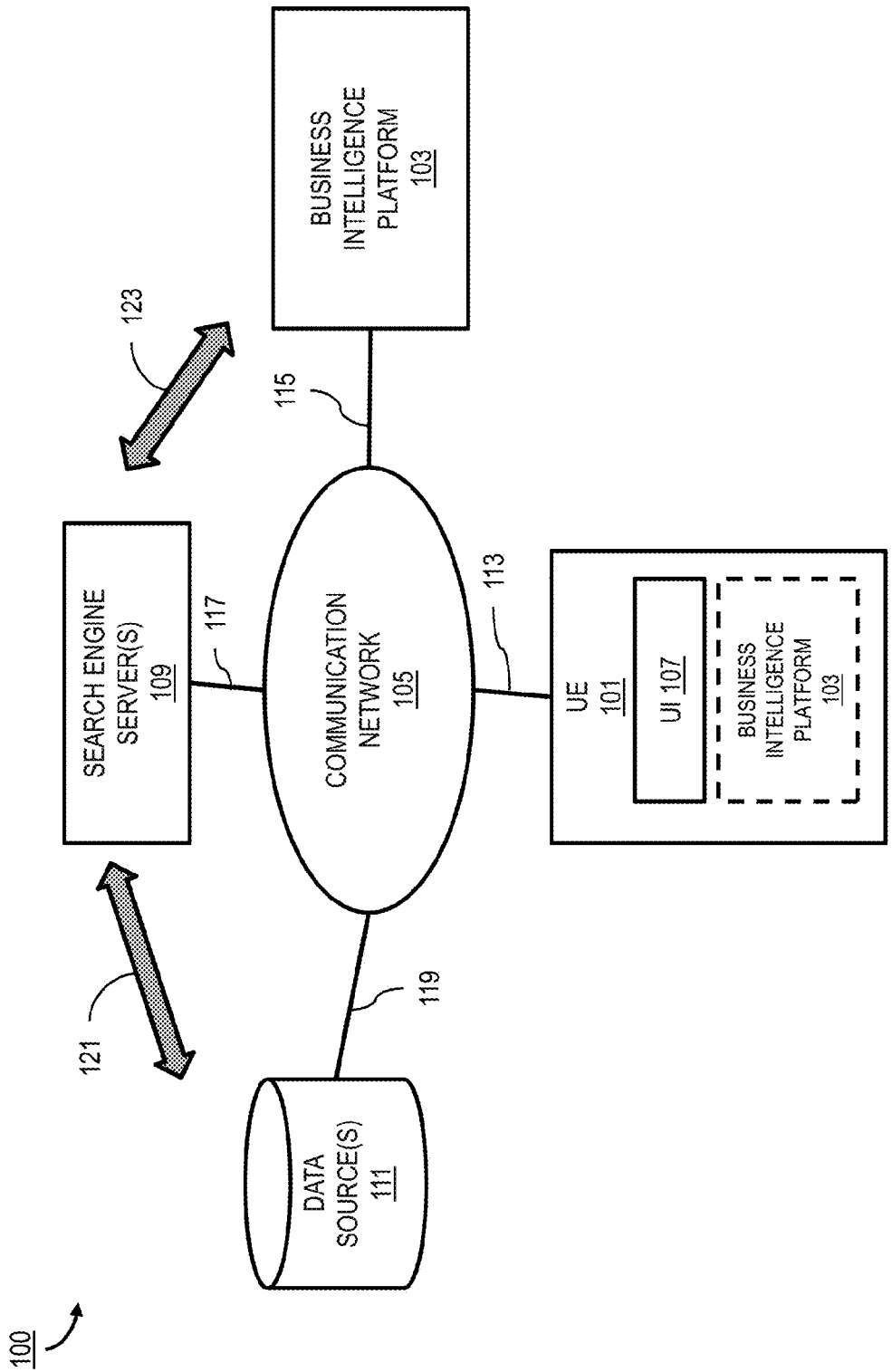
FIG. 1B is a schematic block diagram of a communication network system in which real-time business intelligence functions can be provided, according to an embodiment.

FIG. 1B is a schematic block diagram of a communication network system in which real-time business intelligence functions can be provided, according to an embodiment. A communication network system 100 can include one or more user devices or User Equipments (UEs) 101, each equipped with at least a User Interface (UI) 107; one or more search engine servers 109; one or more data source(s) 111; and a business intelligence platform 103. Any of the devices or platforms of the network system 100 can be equipped with local memory/storage spaces (not shown in FIG. 1B). Furthermore, the devices and platforms of the network system 100 may have access to centralized or distributed memory/storage spaces (not shown in FIG. 1B) through the communication network 105. Thus, FIG. 1B is merely an example illustrating the types of devices and platforms that can be included within a communication network system 100.

Communication network 105 can be any communication network, such as the Internet, configurable to allow the one or more UEs 101, the one or more search engine servers 109, and the business intelligence platform 103 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the UEs 101 can be operatively coupled to a cellular network; and the business intelligence platform 103 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1B, UEs 101 are operatively coupled to communication network 105 via network connection(s) 113; business intelligence platform 103 is operatively coupled to communication network 105 via network connection(s) 115; search engine servers 109 are operatively coupled to communication network 105 via network connection(s) 117; and data source(s) 111 are operatively coupled to communication network 105 via network connection(s) 119. Network connections 113, 115, 117, and 119 can be any appropriate network connection for operatively coupling UEs 101, business intelligence platform 103, the search engine servers 109, and the data source(s) 111. Furthermore, the business intelligence platform 103 can have a direct connection with search engine server(s) 109 via a communication 123 and the search engine server(s) 109 can have a direct connection to the data source(s) 111 via communication 121.

A network connection can be a wireless network connection such as, for example, a wireless fidelity ("Wi-Fi") or Wireless Local Area Network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a communication network system 100 can include more than one UE 101, more than one search engine server 109, and more than one data source 111. A UE 101, and/or a search engine server 109, can be operatively coupled to the communication network 105 by heterogeneous network connections. For example, a first UE 101 can be operatively coupled to the communication network 105 by a WWAN network connection, another UE 101 can be operatively coupled to the communication network 105 by a DSL network connection, and a search engine server 109 can be operatively coupled to the communication network 105 by a fiber-optic network connection.

The search engine server(s) 109 each can be, for example, a web server configured to provide search capabilities to electronic devices, such as UEs 101. The UE 101 can be in communication with the search engine server(s) 109 via the communication network 105, while the communication is managed by the business intelligence platform 103. For example, the business intelligence platform 103 can send a signal to control the communication between the UE 101 and the search engine server(s) 109.

The UEs 101 can be any of a variety of electronic devices that can be operatively coupled to communication network 105. A UE 101 can be a personal computer, a tablet computer, a personal digital assistant (PDA), a cellular telephone, a portable/mobile internet device, television, kiosk display, display screens in vehicles, projection devices, laser display devices, digital display watches, digital display glasses and/or some other electronic communication device with audio and/or visual capabilities. A UE 101 can also be a television set, a streamer device, a set top box, or any other electronic device equipped with a display unit (a UI 107) and a network connection 113 that enables the device to run applications on an operating system. A UE 101 can be operatively coupled to communication network 105 via the UI 107 and network connection 113. The UEs 101 each can include a web browser configured to access a webpage or website hosted on or accessible via the business intelligence platform 103 over communication network 105. The UEs 101 can be configured to support, for example, Hyper Text Markup Language (HTML) using JavaScript. For example, the UEs 101 can include a web browser, such as, Firefox®, Safari®, Dolphin®, Opera®, Internet Explorer (IE)®, and Chrome®. An Internet page or website can be accessed by a user of a web browser at a UE 101 by providing the web browser with a reference such as a uniform resource locator (URL), for example, of a webpage. For example, a user of a UE 101 can access a search engine server 109 via a URL designated for the search engine server 109. In some instances, UEs 101 each can include specialized software other than a browser for accessing a web server such as, for example, a search engine server 109. Specialized software can be, for example, a specialized network-enabled application or program provided by the business intelligence platform 103. In some instances, portions of a website accessible via a web server can be located in a local or remote memory space/data store accessible to the web server.

Data source(s) 111 can be distributed sources of data throughout the communication network system 100. A data source 111 can be at least one of a database, a data warehouse, a file, etc. A UE 101 can also include a display, monitor or user interface (UI) 107, a keyboard, various ports (e.g., a USB port), and other user interface features, such as, for example, touch screen controls, audio components, and/or video components (each not shown).

Figure 2A:
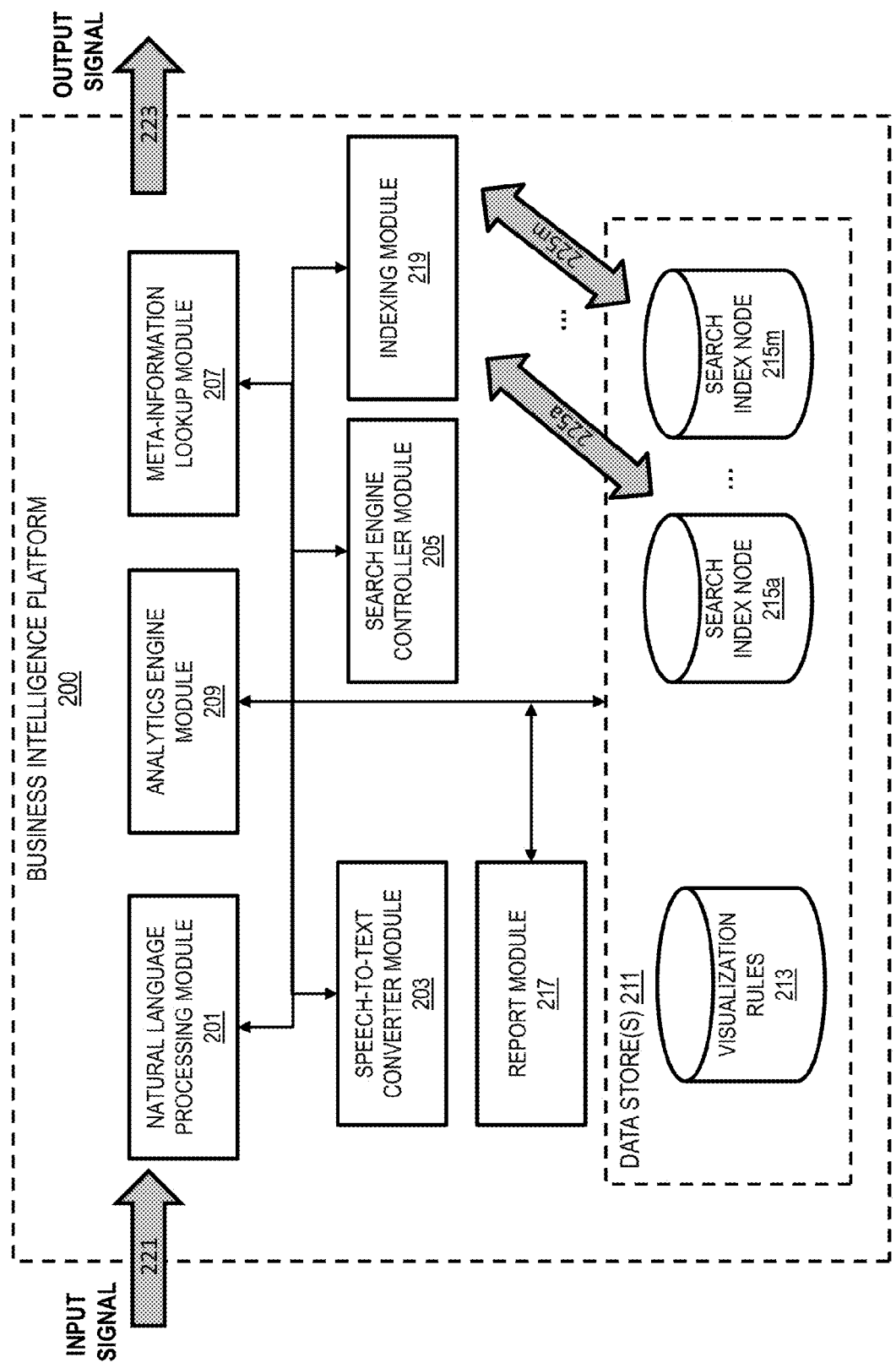
FIG. 2A is a schematic illustration of a real-time business intelligence platform, according to an embodiment.

FIG. 2A is a schematic illustration of a real-time business intelligence platform, according to an embodiment. The business intelligence platform 200 can be similar to the business intelligence platform 103 of FIG. 1B. As shown in FIG. 2, a business intelligence platform 200 can include a natural language processing module 201, a speech-to-text converter module 203, a search engine controller module 205, a meta-information lookup module 207, an analytics engine module 209, one or more data store(s) 211, a report module 217, and an indexing module 219. A data store(s) 211 can include visualization rules 213, and one or more search index nodes 215a-215m. Furthermore, the business intelligence platform 200 communicates with other devices of a communication network system (e.g., communication network system 100 of FIG. 1) via input signal 221 and output signal 223.

In various instances, the business intelligence platform 200 and its components can be located anywhere within a communication network system 100 such as that shown in FIG. 1B including, but not limited to, within the UEs 101, or in separate locations within the communication network system 100 of FIG. 1B. The business intelligence platform 200 can also be provided as on-premise deployment, via private computation clouds, or be embedded into other software or bundled into devices by Original Equipment Manufacturers (OEMs).

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

In some embodiments, the business intelligence platform 200 can provide an analytics platform as a Software as a Service (SaaS) such that, for example, the business intelligence services are centrally hosted on the information cloud (not shown) for independent software vendors, system integrators, analytics consultants, enterprises, etc., to build multi-tenant business intelligence and embedded analytics solutions for external and internal customers, for example, by using a browser. The business intelligence platform 200 can enable users to mashup data from various sources for real-time ad-hoc analysis, build reports with rich visualizations and dynamic dashboards, and collaborate in-place among stakeholders to make informed decisions. The business intelligence platform 200 can provide capability of reducing data into smaller parts or views that can yield more information (e.g., slice and dice), drill downs and search on data. For example, a multi-dimensional data structure can be considered as a data cube and the act of picking a rectangular subset of a data cube by choosing a single value for one of its dimensions can define a new data cube with one fewer dimension (e.g., slice operation). Other operations can produce sub-cubes, for example, by allowing an analyst to pick specific values of multiple dimensions (e.g., dice operation). Furthermore, a drill down/up operation allows the user to navigate among levels of data ranging from the most summarized (up) to the most detailed (down).

In some instances, the business intelligence platform 200 receives an input via the input signal 221 representing a question entered by a user of a UE 101. The UE 101, for example, can be equipped with sound input devices and a user can enter a question as a speech input by speaking into a microphone. In such instances, the speech-to-text converter module 203 can convert the speech into text (e.g., as a HTTP request) and send a signal representing the input query to the natural language processing module 201.

In some instances, the speech-to-text converter module 203 can send a signal representing the converted request to the meta-information lookup module 207. The meta-information lookup module 207 can search the data store(s) 211, or a data source(s) 111, for keywords matching the query. The meta-information module 207 can store the keywords in data store(s) 211. The keywords can be used for suggesting search phrase completions to the user of UE 101, for example, when user is typing a question.

In some instances, the natural language processing module 201 receives the query and translates the query into an analytics query (e.g., a query including logical reasoning for finding an answer). For example, if a question in English asks for "all sales", in the business intelligence context, the natural language processing module 201 can translate the question to "total sales". The natural language processing module 201 can send a signal to the analytics engine module 209 representing the analytics query. Furthermore, the natural language processing module 201 can define a presentation type (e.g., line chart, pie chart, etc.) for the query results using the visualization rules 213. Further embodiments of the natural language processing module 201 and/or its functionality are provided in co-pending U.S. non-provisional application Ser. No. 14/304,487, entitled "Methods and System for Providing Real-Time Business Intelligence using Natural Language Query Answer," which is herein expressly incorporated by reference.

In some instances, the analytics engine module 209 can operate as the primary computational engine which transforms the analytics query into a search query and sends a signal representing the search query to the search engine controller module 205. The search engine controller module 205 can perform a parallel distribution of the search query to one or more search engine server(s) (shown as 109 in FIG. 1B), for example via an output signal 223 (shown as 123 in FIG. 1B). The search engine(s) 109 performs search on various distributed search index nodes 215a-215m and sends a signal (not shown) representing the search results to the analytics engine module 209.

In some instances, the indexing module 219 collects, parses, and stores search data in search index nodes 215a-215m via connections 225a-225m to facilitate fast and accurate information retrieval. The indexing module 219 is described in more detail herein with regards to FIG. 3.

In some instances, the analytics engine module 209 can receive data from the search engine controller module 205 and perform real-time computations on the data based on statistical, mathematical, logical heuristic and/or algorithmic functions to generate computed and aggregated results. The results can be further visually transformed based on the visualization rules 213 and presented to the user of UE 101.

In some instances, the user can define rules and/or formulas by which the indexing module 219 or the analytics engine module 209 can calculate derived and/or computed attributes from the original data. The user-defined rules and formulas can be received from a UE 101 via an input signal 221 and stored in data store 211. The attributes computed by the analytics engine module 209 may not be directly present in the original data and derived or computed from other attributes present in the original data using the rules and/or formula defined by the user. The user-defined rules and/or formulas can be applied on the data before the data is indexed by the indexing module 219 or at run-time before presenting the query results to the user via a UE 101. In some instances, the analytics engine module 209 receives the search results and performs statistical computations, aggregations, etc. on the results (e.g., in parallel). The analytics engine module 209 can store the analysis results in data store(s) 211.

In some instances, the report module 217 produces reports from the analysis results, for example, by applying the visualization rules 213 to the results. The visualization rules can provide guidelines for reports such as, for example, chart types, colors, formats, etc. The visualization rules 213 can be interactively managed. Thus, the visualization rules can be modified or trained by self learning using machine learning techniques. For example, the visualization rules 213 can be trained such that total sales report is presented as pie chart, while comparative sales report (e.g., among branches of an enterprise) can be presented as bar charts to enable comparison, based on history of users' report selections. The report module 217 can use machine learning techniques to learn (e.g., train visualization rules) based on data, data types, data analysis types, data analysis results, user selection history, etc. In some instances, a user of UE 101 is given the capability to change presentation of data such as, for example, graph type, table formats, etc. In some instances, the reports produced by the report module 217 are stored in data store(s) 211 and are available until changes (e.g., updates, inserts, deletes, etc.) in source data is recognized. In such change instances, the stored reports are erased from the data store(s) 211 and new reports are produced based on the new data.

In some instances, the business intelligence platform 200 can receive user feedback via the UI 107 of UE 101 of FIG. 1B to train and automatically improve various modules such as, for example, the natural language processing module 201, the speech-to-text converter module 203, the meta-information lookup module 207, the analytics engine module 209, or the report module 217. The business intelligence platform 200 can also use the user feedback for improving the visualization rules 213. These improvements enable the business intelligence platform 200 to automatically adapt to different use cases and become more accurate in delivering results for various queries in various use cases, over time. The user feedback can be provided either directly by the user via UE 101 or collected automatically by the business intelligence platform 200, for example, based on the usage patterns of various users.

Figure 2B:
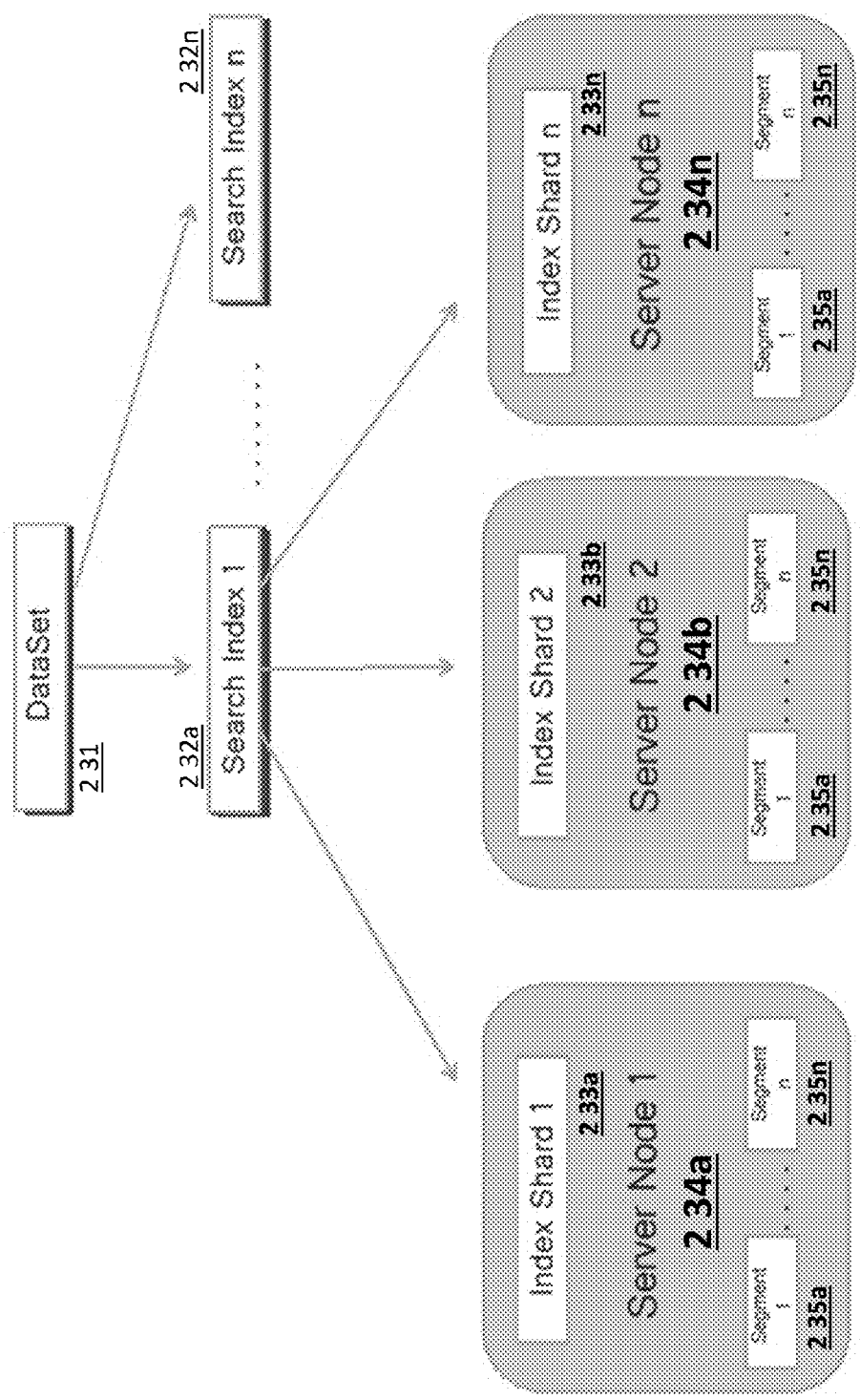
FIG. 2B is a schematic block diagram of an index topology infrastructure of an indexing module, according to an embodiment.

FIG. 2B is a schematic block diagram of an index topology infrastructure of an indexing module, according to an embodiment. In one embodiment, the index module 219 in FIG. 2A may employ an index topology (e.g., 230) to index and store data analytics, e.g., in the form as DataSet(s) (e.g., 231) which are persisted as search indices (e.g., 232a-232n). A DataSet 231 is stored with one or more search indices 232a-232n, each of which then gets partitioned into smaller data sets, such as one or more index shards (e.g., 233a-233n) and segments (e.g., 235a-235n). For example, distributed server node engines (e.g., 234a-234n) may be employed, each of which stores one or more shards (e.g., 233a-233n) and segments (e.g., 235a-235n).

In one implementation, when a user asks a "question" through a user interface (e.g., via 501 in FIG. 5) and/or submits a request to obtain a business analytics report, the natural language processing module (e.g. 207 in FIG. 2A) may produce an intermediate query format. A query optimizer may then define an execution path for the intermediate query-formatted query, and this query gets transmitted to each of the shards (e.g., 233a-233n, shards can exist in same machine or different machine). Each node engine (e.g., 234a-234n) may run a search query on the local index the distributed node is based on (e.g., search index 232a for server nodes 234a-n) and select the eligible data.

The indexing module 219 may employ a just-in-time-memory mechanism for data retrieval. Because each column of a data set may be indexed independently, instead of loading entire row, data for the columns of interests can be loaded to memory, in response to the server node engines (e.g., 234a-n) running the search query. In this way, the data input/output and transmission volume may be reduced, and usage of the memory is improved. In another example, the index module 219 may make efficient use of disk cache. For example, when a search requires a high memory, e.g., when the search is performed at a Cheetah system, the search engine controller module 205 can keep track of available memory and start using disk cache when system resources (such as memory space) is low. In this way, the search engine could be maintained without interruption due to resource unavailability.

In one implementation, the selected data from each node engine 234a-234n may go through multi-phased search aggregation to be aggregated. For example, a post local search aggregator may be employed, which selects one master node from the server nodes 234a-n and does the final aggregation on the master node. This aggregated data is then converted into a user-representable format and displayed using different visualization techniques. In another example, the indexing module 219 in FIG. 2A may employ sharded-compressed bit-map-indexing techniques, where data is stored in multiple shards 233a-233n, which are configurable based on the data size. In another example, the indexing module 219 can employ multi-level search aggregators so that the data is distributed in 10 shards (e.g., 233a-233n) and each shard is placed in a separate server node, see e.g., 233a placed in 234a, 233b placed in 234b, and/or the like. When an analytics query is initiated, it may be sent to each of these server nodes 234a-n. In this case, each server node performs search aggregation for the data that belongs to that server node and returns the data to the master server node for the final aggregation. This mechanism could reduce the amount of data movement across a given server node, which improves overall efficiency in data search and aggregation in addition to making use of parallel computation.

Figure 3A:
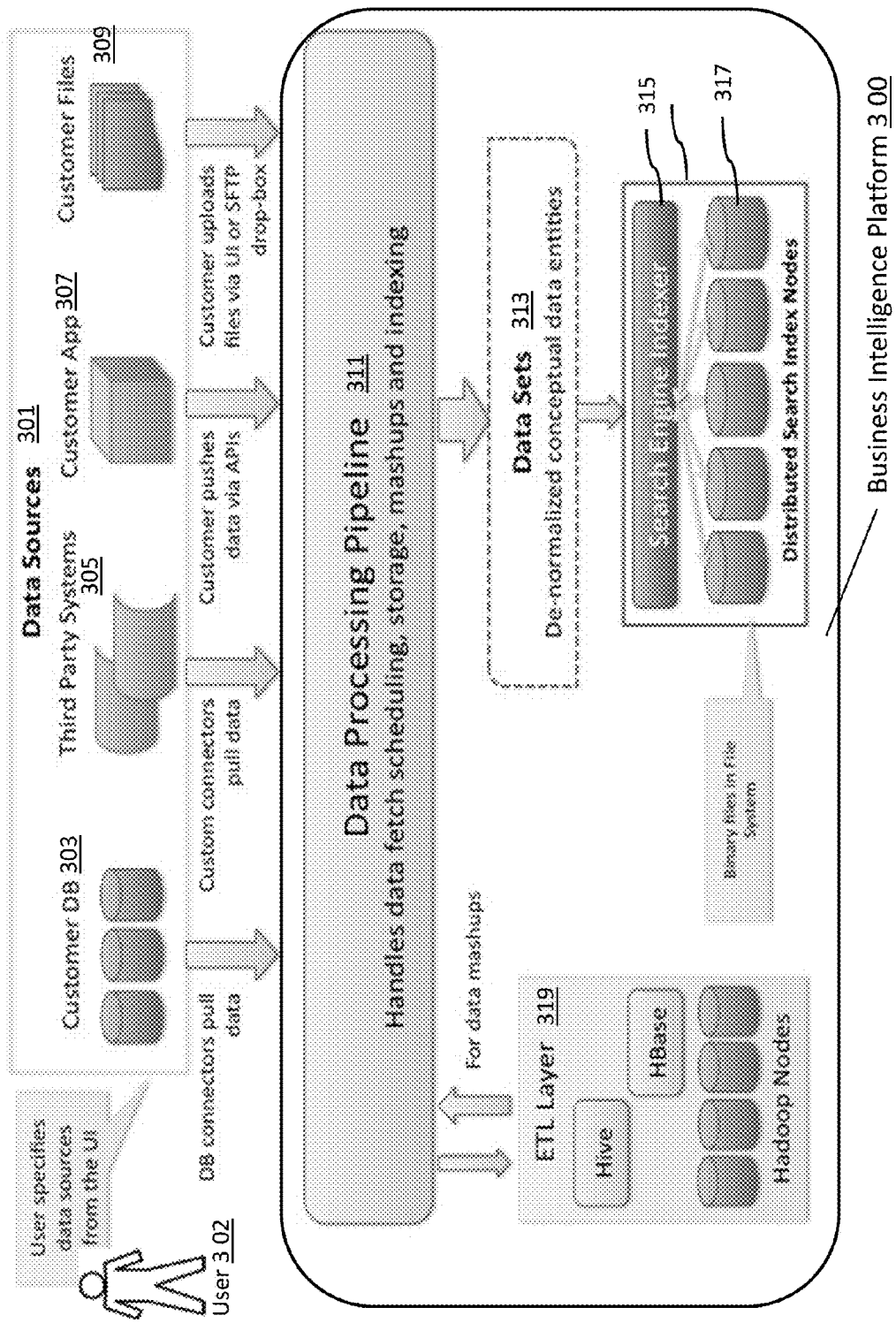
FIG. 3A is a schematic block diagram of a data indexing process pipeline, according to an embodiment.

FIG. 3A is a schematic block diagram of a data indexing process pipeline, according to an embodiment. In some instances, a user of a UE 101 of FIG. 1B selects data to be included in a query from data sources 301. The data sources 301 can be similar to data source(s) 111 of FIG. 1B. The data sources 301 can include customer databases 303 (e.g., databases associated with a user or a group of users), third party data systems 305 (e.g., databases or files provided to the user by software providers, data providers, etc.), customer applications 307 (e.g., software applications associated with a user or a group of users such as, for example, financial applications), customer files 309 (files associated with a user or a group of users such as, for example, documents uploaded by the user via the UE 101 or by using file transfer protocols such as, for example, FTP/SFTP, SCP, etc. For example, if a user wants to define a query as "annual sales by city" the user can select data fields representing sales value and city from a sales table in a customer database 303. As shown in FIG. 3A, the data source(s) 301 can interact with the business intelligence platform 300, which may obtain data from the data source(s) 301.

In some instances, the indexing module 219 of FIG. 2A executes a data processing pipeline 311. The indexing module 219 can receive the data selected by the user from data sources 301 and process the data through the data processing pipeline 311 by, for example, combining and indexing the data. For example, the data processing pipeline 311 can include one or more database connectors (not shown in FIG. 3A) to pull data from the customer databases 303, and one or more custom connectors (not shown in FIG. 3A) to pull data from the third party data systems 305). The data processing pipeline 311 can receive data associated with customer applications 307 from a UE 101 via an Application Programming Interface (API) (not shown in FIG. 3). The data processing pipeline 311 can also receive customer files 309 from UE 101 via UI 107 or, for example, via a Secure Shell File Transfer Protocol (SFTP).

Data indexing process, for example, can include defining a data structure that improves the speed of data retrieval operations. For example, indices can be defined using one or more columns of a database table, providing the basis for both rapid random lookups and efficient access of ordered records. In addition, mashup process can be also performed on the data, for example, by the indexing module 219. A mashup process enables the data from various sources to be combined to produce new data sources (or newly searchable data sources) 301. The term mashup includes, for example, easy, fast integration, frequently using open application programming interfaces (API) and data sources to produce results (e.g., answers to queries) that may not be related to the original reason for producing the raw source data. The mashup process by the data processing pipeline 311 can be performed based on processes of Extract, Transform, Load (ETL) layer 319 associated with a database or a data warehouse (not shown in FIG. 3). An ETL process can extract data from various data sources such as relational databases such as, for example, Oracle®, MySQL®, MS SQL Server®, PostGreSQL®, DB2®, etc.; non-relational databases and NoSQL storages such as, for example, MongoDB®, Cassandra®, CouchDB®, Redis®, HBase®, Hive® etc.; distributed file systems such as, for example, Apache's Hadoop® file systems etc.; other storage systems such as, for example, Netezza®, Terradata®, SAP Hana® etc.; third party software or services such as, for example, Salesforce®, NetSuite®, MS Dynamics®, MS Dynamics GP®, SugarCRM®, etc. In some instances, the indexing module 219 can store the newly-produced data sets 313 by the data processing pipeline 311 in data store(s) 211. The data sets 313 are de-normalized conceptual data entities extracted from data sources 301 to be used for defining search index nodes 317.

In some instances, a search engine indexer 315 (similar to the search engine control module 205) can use the data sets 313 to define distributed search index nodes 317. The distributed search index nodes 317 can be similar to search index nodes 215*a*-215*m*. The search index nodes 317 can include data extracted, transformed, and loaded by the ETL layer 319.

Figure 3B:
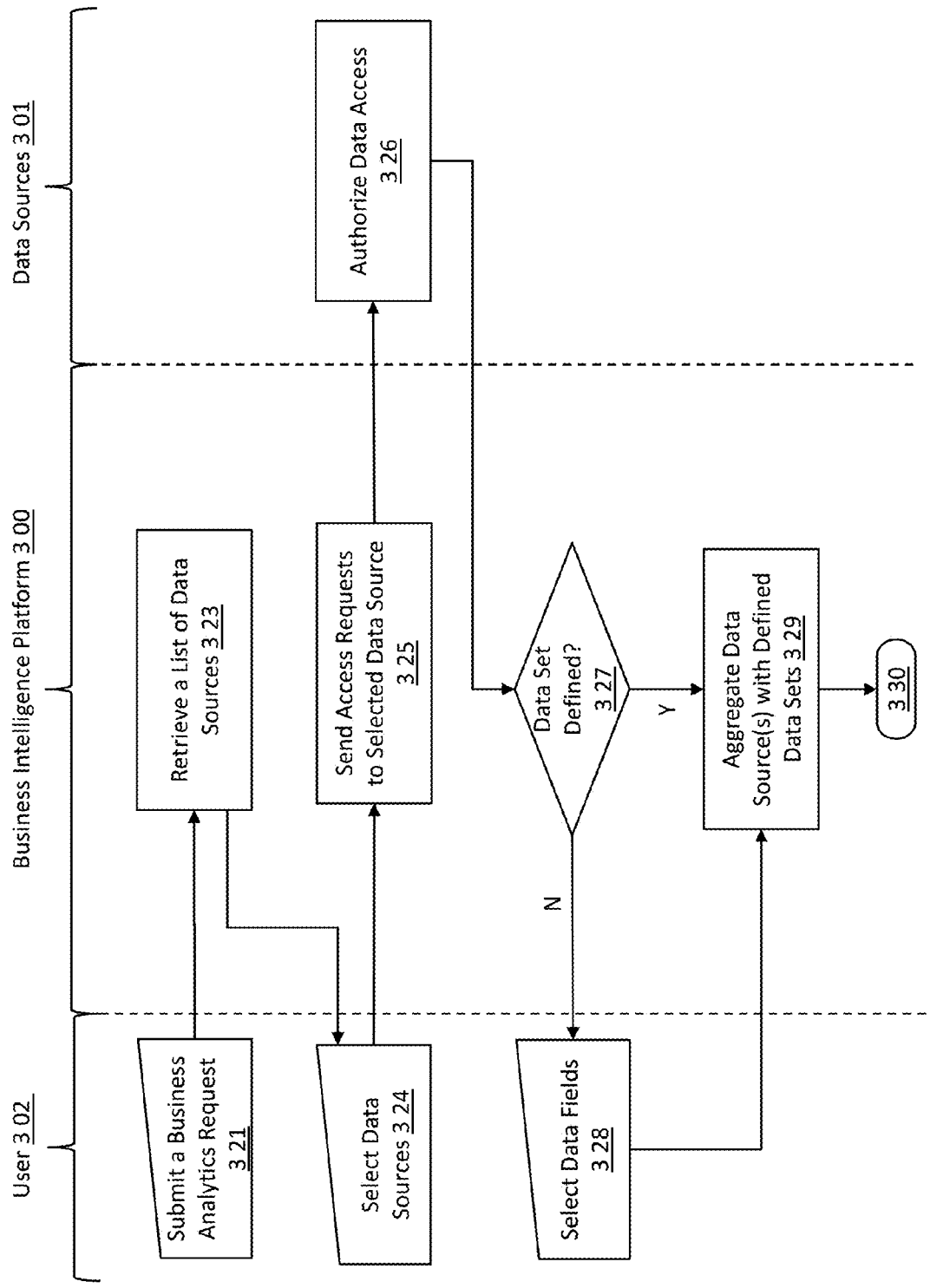
FIGS. 3B-3D are example logic flow diagrams illustrating real-time business analytics query and report generation, according to an embodiment.
Figure 3C:
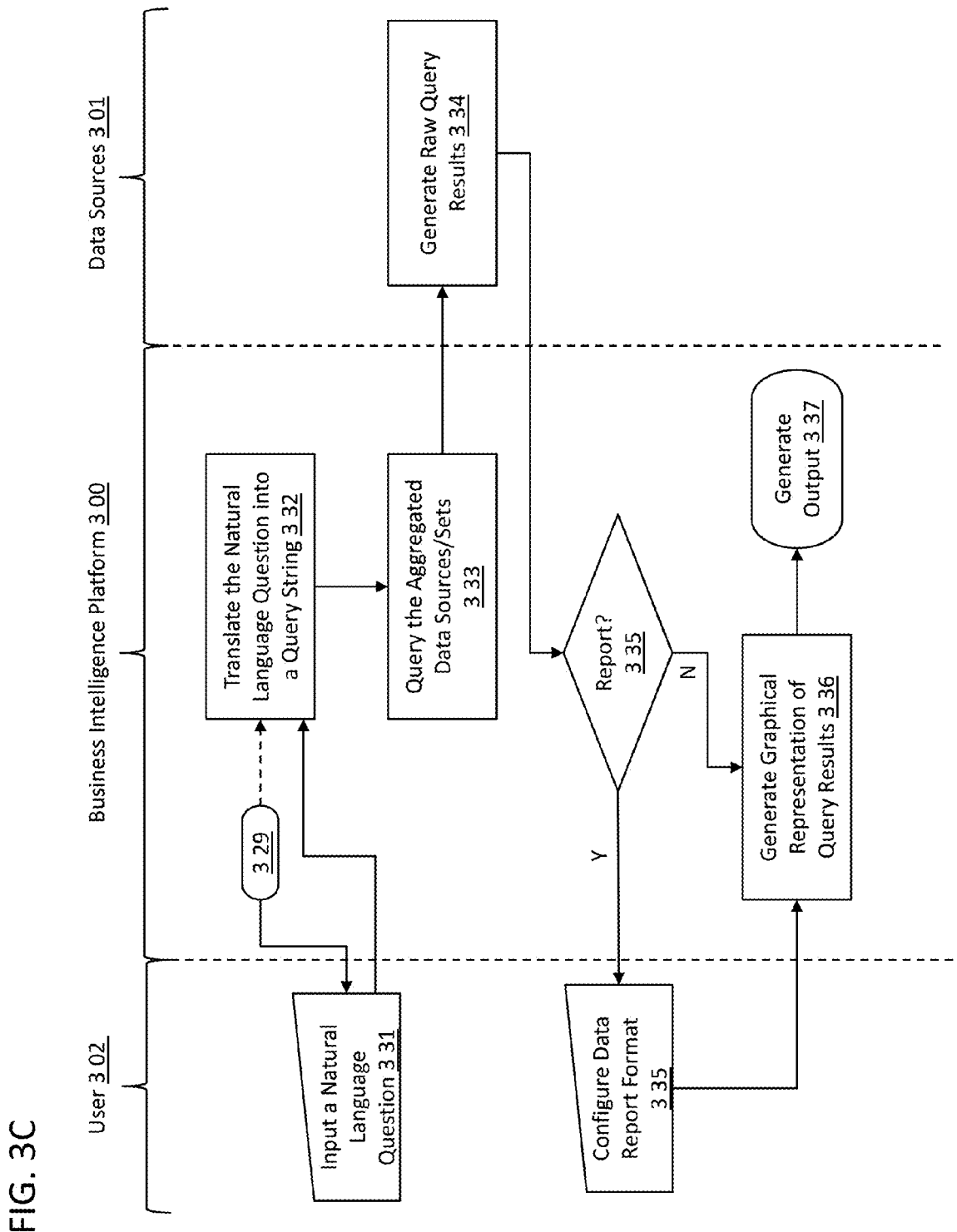
Figure 3D:
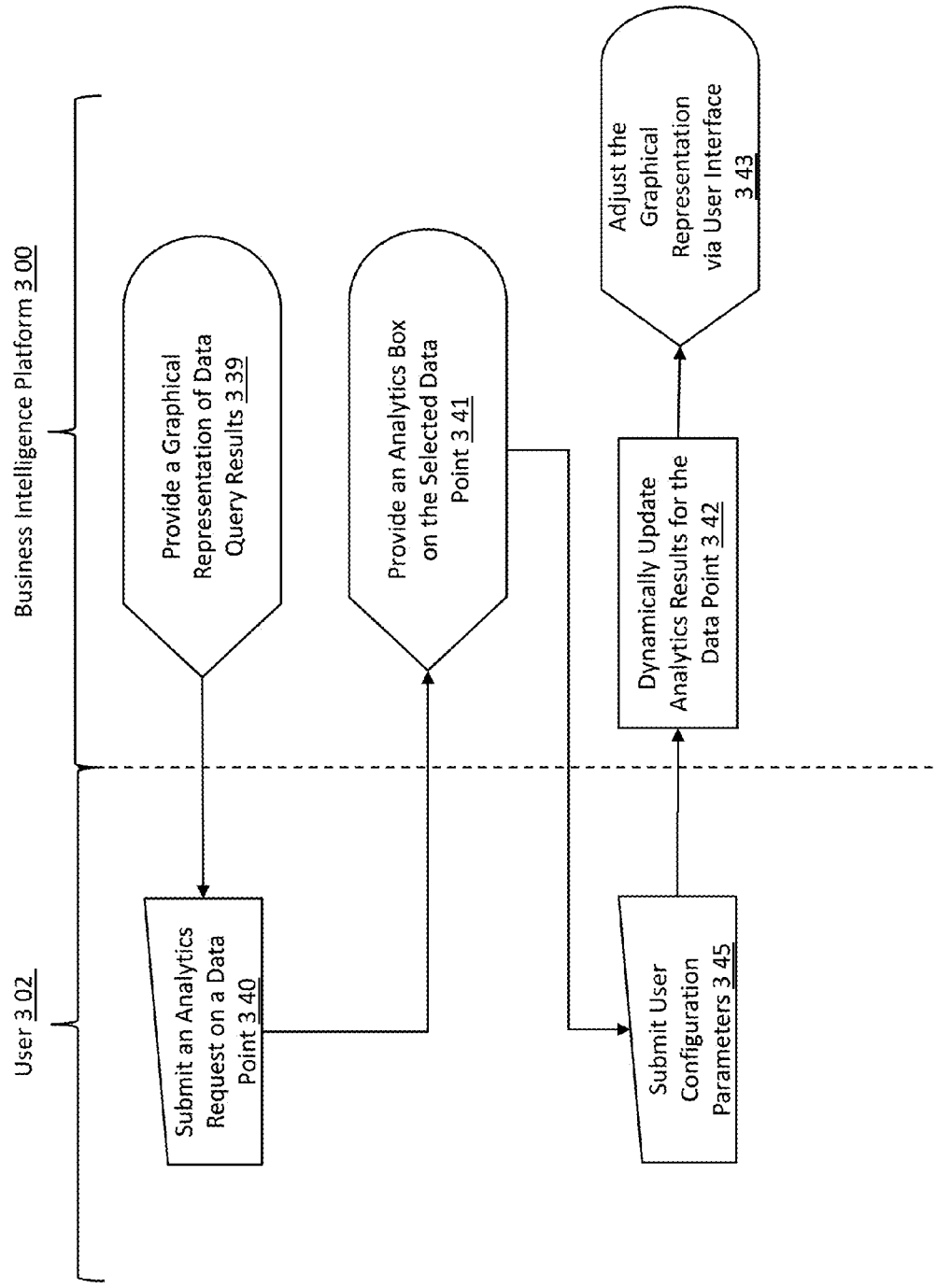

FIGS. 3B-3D are example logic flow diagrams illustrating real-time business analytics query and report generation, according to an embodiment. With reference to FIG. 3B, a user 302 (also as shown as 302 in FIG. 3A) can submit a business analytics request 321 to the business intelligence platform 300 (also as shown as 300 in FIG. 3A) via a user interface at a user compute device (e.g., see FIG. 5), which can retrieve a list of data sources for the query at 323. The business analytics request 321 may include a user-desired, or user-interested data variable, such as "revenue," "profit," and/or the like. In one implementation, the business intelligence platform 300 may retrieve all available data sources. In another implementation, the business intelligence platform 300 can perform a preliminary search and retrieve relevant data sources, e.g., based on the user's past search history, the user's previously manually selected data sources, user industry, user geographical information, and/or the like.

Figure 4A:
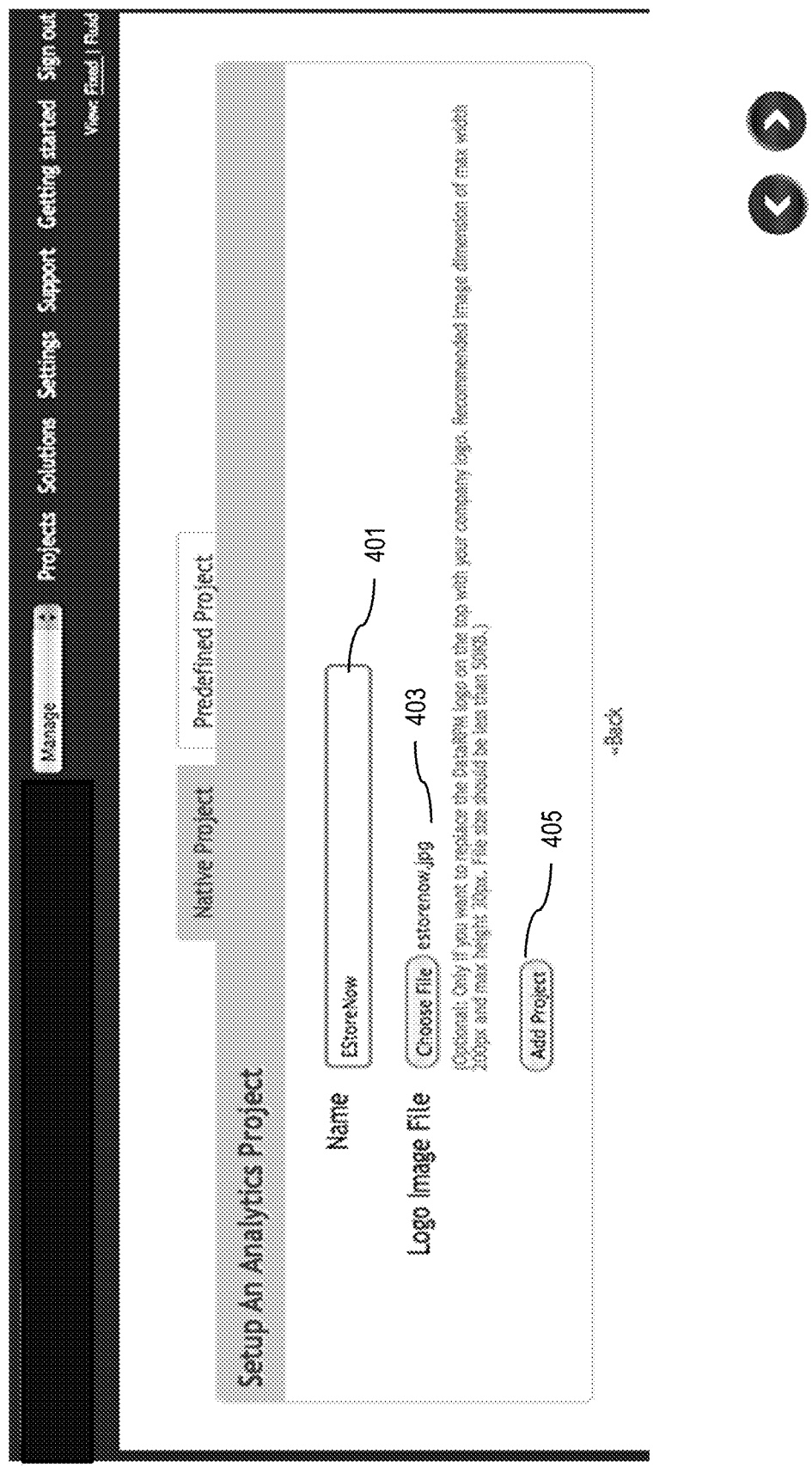
FIGS. 4A-4D are sample display menus for a real-time business intelligence providing system, according to an embodiment.
Figure 4B:
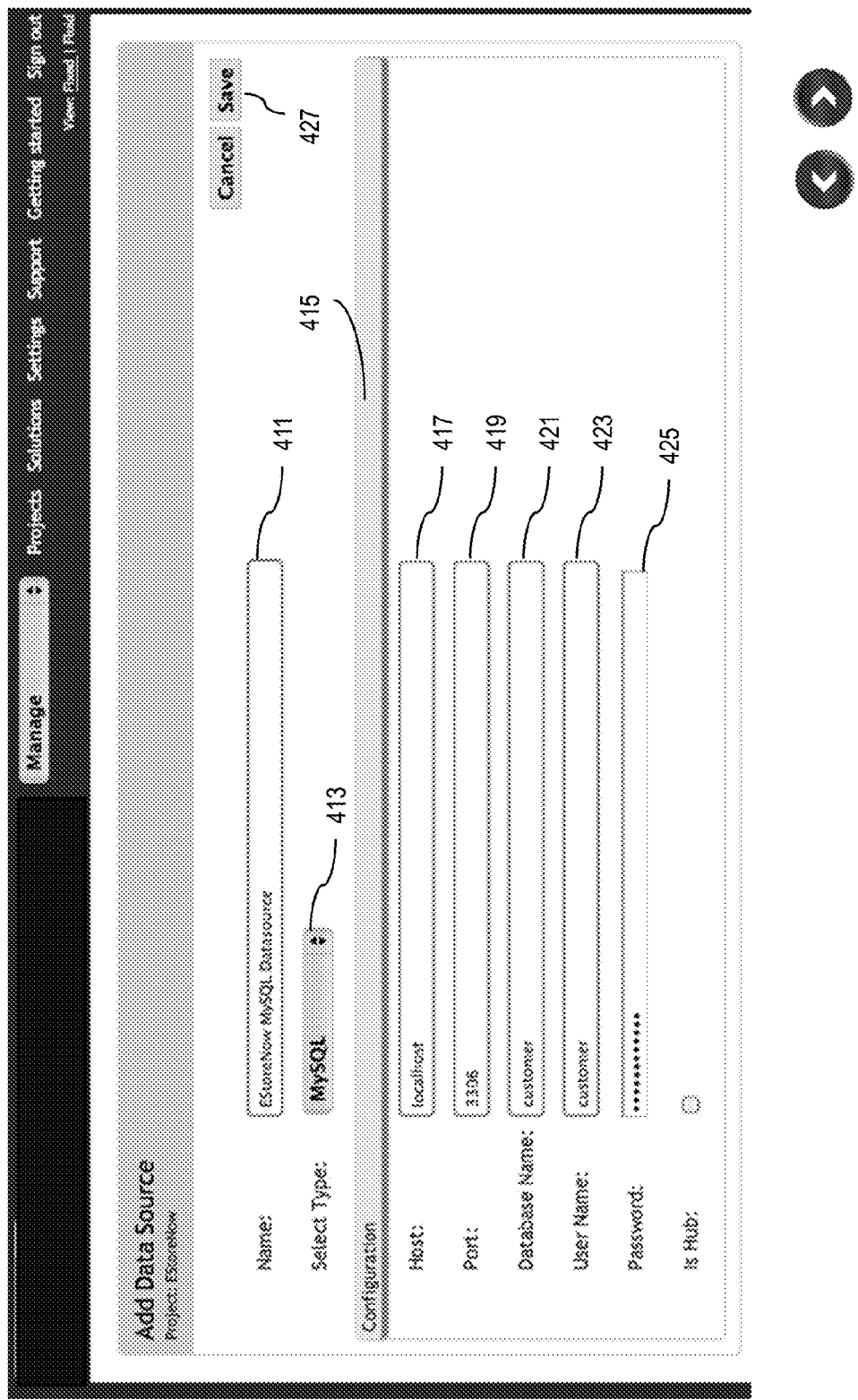

As shown in FIG. 3B, the user 302 may optionally select data sources for the user's inquiry at 324 (e.g., see FIG. 4B). The user, by operating a user compute device, can send a signal representing configuration parameters with regard to a selected data source to the business intelligence platform 300. The business intelligence platform 300 may optionally send an access request to the user selected data source(s) at 325, and in response, the data source(s) 301 may authorize data access of the business intelligence platform 300, e.g., at 326.

As shown in FIG. 3B, the business intelligence platform 300 can define whether the user elects to further define a data set for the query at 327. If no data set was previously-defined, the user may optionally define the data set at 328. For example, the user may select data fields from a data table in a data source to define a customized data set (e.g., see FIG. 4C). After the data set is defined or a previously defined data set is identified, the business intelligence platform 300 may aggregate the data source and defined data sets at 329, and prepare to perform a data query.

Continuing on with FIG. 3C, the user can input, via a user interface at the user compute device, a natural language question at 330, which may be input before or after the user has configured the data source(s) and/or defined the data set(s). The user, via the user compute device, can send a signal representing the natural language question to the business intelligence platform 300. The business intelligence platform 300 can translate the natural language question into a query string at 332 (e.g., via the natural language processing module 201 in FIG. 2), and query the aggregated data sources and/or defined data sets at 333. In response to the query, the data sources 301 can provide raw data as query results at 334.

In one implementation, the business intelligence platform 300 may provide the raw query data to the user 302, via the user compute device, upon user request, e.g., in a spreadsheet format or a ".csv" file for the user to download, etc. In another implementation, the user may elects, via the user compute device, to obtain the business analytics query results in a report format at 335. If the business intelligence platform 300 determines a report is requested by the user at 335, the user 302 can elect, via the user compute device, to configure report format at 335 (e.g., chart type, desired display parameters, etc.). The user compute device can send a signal representing the report election to the business intelligence platform 300. The business intelligence platform 300 may in turn generate graphical representation of the query results at 336, which may be generated as output via a user interface at 337 (e.g., see FIGS. 6-8 and 10).

With reference to FIG. 3D, a user 302 may interact with the business intelligence platform 300 via a user interface through the user compute device to dynamically change the graphical representation of business analytics query results. In one implementation, the business intelligence platform 300 may provide a graphical representation of data query results 339, and the user 302 may submit, via the user compute device, an analytics request on a data point of the graphical representation of query results at 340 (e.g., a data plot curve, etc.), such as clicking or moving the mouse over a data point on a data plot curve, etc. In one implementation, business intelligence platform 300 can provide an engageable widget at 341, such as but not limited to a dialog box, a drop-down menu, and/or any user-interactive user interface widget, which is triggered by a mouse click and/or the mouse moving over to a data point. An example engageable widget may include an analytics box on the selected data point (e.g., see the drill down drop box 701 in FIG. 7, which may be used for interactive filtering of the data query results, based on an age-group, a deal type, a deal name, etc.). The user can submit the configuration parameter at 345, and the business intelligence platform 300 can in turn dynamically update the data analytics for the data point associated with the user submitted configuration parameter at 342, and adjust the graphical representation of analytics data query results at 343.

FIGS. 4A-4D are sample display menus for a real-time business intelligence providing system, according to an embodiment. FIG. 4A is a display menu for adding a new project. In some instances, a project is a dedicated workspace for a user of UE 101. This workspace can be in a local storage of UE 101, in data store(s) 211, or in a computation cloud associated with the business intelligence platform 200. The workspace provides capability of exploring, analyzing data, producing reports and dashboards for a particular user. This is highly secure area which will be accessible with proper permissions.

In some instances, a user can sign into the business intelligence platform 200 using a user ID and a Password. After signing in, the user can define a project by, for example, defining a project name 401, and a logo 403. By clicking the button 405, the new project is defined.

FIG. 4B is a display menus for selecting data sources by a user of UE 101 as described with regards to FIG. 3. In some instances, a user of UE 101 can define a name 411 for a new data source to be added to the data sources 301. The user can then select a type for the data source from a drop down menu 413. Some standard data types can be, for example, MySQL®, Oracle®, MS SQL Server, etc. The user can also select "file upload" as data types. If "file upload" is selected, a new window is opened to allow the user to upload a file as a data source. The user can also select a configuration of the upload file to show, for example, if the upload file is a document, a spreadsheet, an image, a database table, etc. In addition, the user can define a data set as a data source explained herein with regards to FIG. 4C.

In some instances, a configuration window 415 enables the user to enter his/her credentials for authorizing access to a data source such as, for example, a database. The credentials may include a host name 417, a port 419, a database name 421, a user ID 423 and password 425, etc. The user can then click on button 427 to save the new data source. In some instances, as described with regards to FIG. 3, the user of UE 101 can select data from various data sources (301) and combine them into a new data set (313) (e.g., a table, a spreadsheet, etc.) by the data processing pipeline 311. For example, the user can select a data source (at 421) and enter his/her credentials indicating user's authority to access the data source such as a user name 423 and a password 425. By pressing the save button 427, the indicated data source is saved, for example, in data store(s) 211 and can be used by the business intelligence platform 200 for further analysis.

Figure 4C:

FIG. 4C is a display menu for defining a new data set, according to an embodiment. In the new data set screen of FIG. 4C, the user can select a data source (e.g., a database) from the drop box 431. The user can add columns from multiple data sources accessible to the user to produce a new data set through key relationships among the data sources. For example, if data sources are tables in relational databases, each data table has a primary key that uniquely specifies a tuple within the table. A data field of a table can be a foreign key that matches the primary key of another table. The foreign key can be used to cross-reference the two tables. The user can then select a table or data set (e.g., a datasheet) from the selected data source (at 433). For every table/data set selected at 433, the corresponding set of column headers or field names is displayed in list 435. The user can select fields from the selected table/data set by dragging the fields from table 435 and dropping them in box 437. The user can also add every column using the Select All button 439.

In various instances, the business intelligence platform 200 provides various types of data analysis elements such as, for example, dimensions (441), measures (443) and date/time (445). Dimensions 441 are the context or categories based on which measures 443 are summarized meaningfully such as, for example, "Sales by City", where "City" is a dimension 441. Measures are typically quantifiable (e.g., numeric) such as, for example, Salary, Revenue, Sales, Margin, etc. The date/time element is used to define a time dimension. For example, the user can assign a date column of the data set to the date/time element to define a time trend in data analysis.

In some instances, the business intelligence platform 200 can assign an element to each data column added to the new data set by default by inferring the data type of the data column based on a content of the column. For example, if a sales column (with numeric data values) is added to a data set, the sales column can be defined as a measure element 443 in the data set. As another example, if a name data column (with character string data values) is added to a data set, the name column can be defined as a dimension 441 in the data set. In some instances, the business intelligence platform 200 enables the user to reassign a column to a dimension 441 instead of a measure 443 by dragging and dropping the filed from list 435 into dimension 441 of table 437.

Figure 4D:
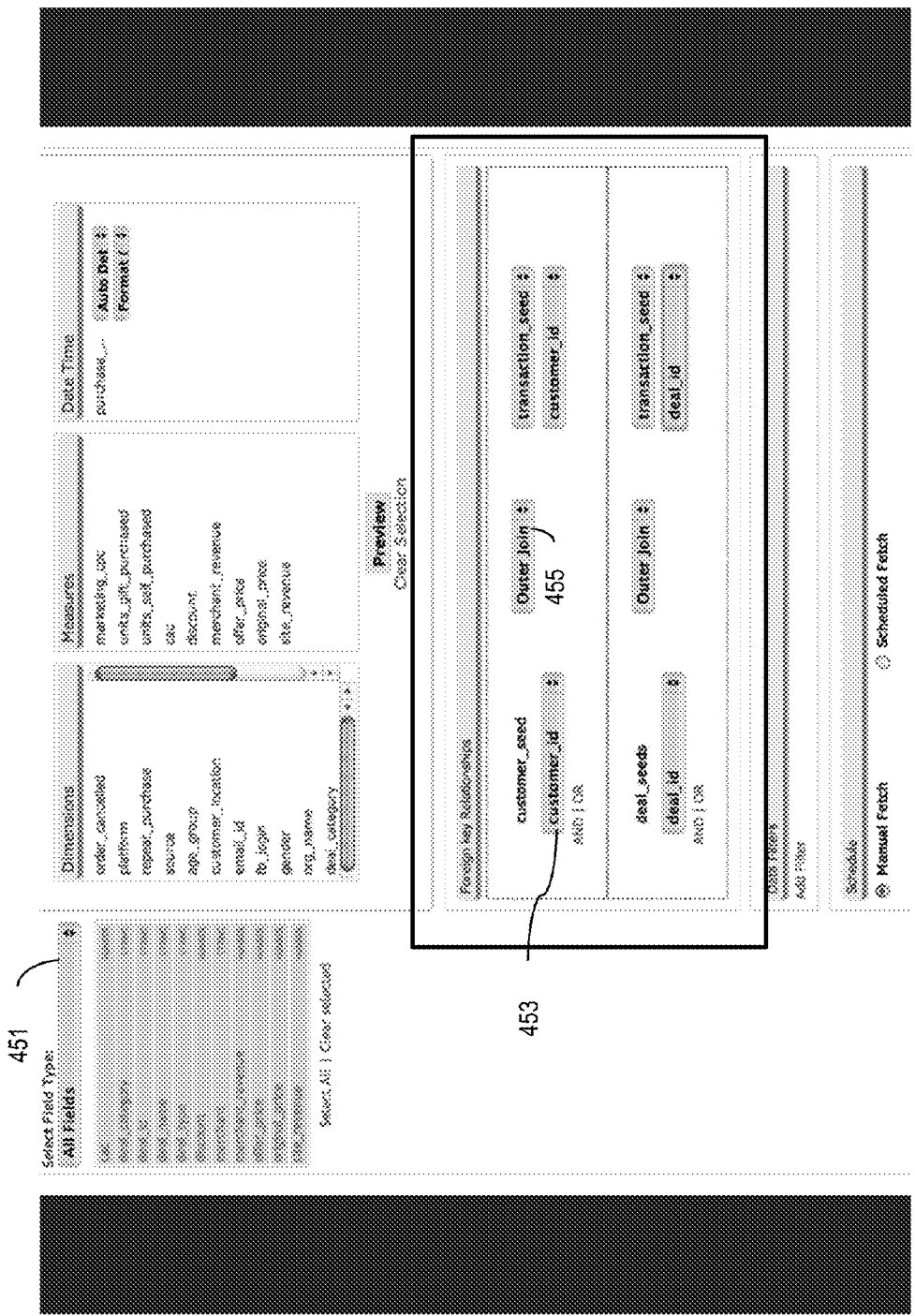

FIG. 4D is a display menu for defining relationships between data sets and/or data elements, according to an embodiment. In some instances, the user is enabled to define key relationships (e.g., primary key, foreign key) across tables/data sets (e.g., if columns of data in the data set exist across tables/data sets) as well as unique keys. Furthermore, if a new data set contains columns of data across tables or data sources, a Primary Key/Foreign Key relationship can be defined. In some instances the ETL Layer 319 can automatically determine the relationships between tables by reading the metadata information or data dictionaries/definitions from the data source or by using heuristics, rules or other algorithms. For example, as seen in FIG. 4D, the user can select key fields from the data fields 451 using the drop box 453; select an operation such as, for example, database operation union (to combine tuples of two data tables and removes all duplicate tuples), database operation join (to connect two data tables over their common data column), etc. from the drop box 455; and apply the operation to selected data fields to define a relationship between the data fields. The user is also enabled to filter columns of the new data set based on a rule (not shown). For example, the user can define a rule by restricting the length of the column value (e.g., 10 digits), or enter a string value such as Sales to filter the added column based on the value. The rules can be combined using "AND"/"OR" clauses.

In some instances, the user is enabled to edit a defined data set (edit display is not shown). The user is also enabled to edit dimensions and measures associated with data fields of a data set (e.g., change a dimension into a measure). In some instances, the user is enabled to define a new measure, or a new dimension, based on a combination of existing measures and/or dimensions using certain formula or rules. The user is also enabled to edit data set rules and/or define new rules. Furthermore, if a new column is added to the data source (based on which a new data set is defined) and the data source has been reloaded (edited) to include the new column, the user can be notified about the new column and the user is enabled to add the new column to the defined data set as a dimension, measure or a date/time element, for example, by updating the new data set, by defining a copy of the new data set including the new column, etc. The user is also enabled to rename a defined data set. In some instances, a data set can be automatically created, for example by the business intelligence platform 200, once the user connects a data source by using metadata associated with the data source, data dictionaries/definitions from the data source, heuristics, rules, one or more predefined algorithms, etc.

In some instances, the user is enabled to specify the frequency at which data is indexed from the data source. The user can choose frequencies such as, for example, one hour, six hours, one day, one week, etc. In some instances the user is enabled to choose precise times such as, for example 12 PM every day, etc. The user can also be enabled to choose the fields that uniquely define a record or a row of data to support data updates. Furthermore, the user can select the fields using which the new records can be fetched incrementally. For example, a date/time field can be selected to identify new records. In some instances the ETL Layer 319 can automatically determine the best frequency using certain predefined rules or by learning from previous data fetch instances using machine learning or heuristics algorithms.

FIGS. 4A-4D are set-up display menus enabling a user to setup a project including selecting data sources, defining data sets, defining relations between data sets, etc. Once a project setup is completed, the business intelligence platform 200 can provide business intelligence to the user in response to user queries.

Figure 5:
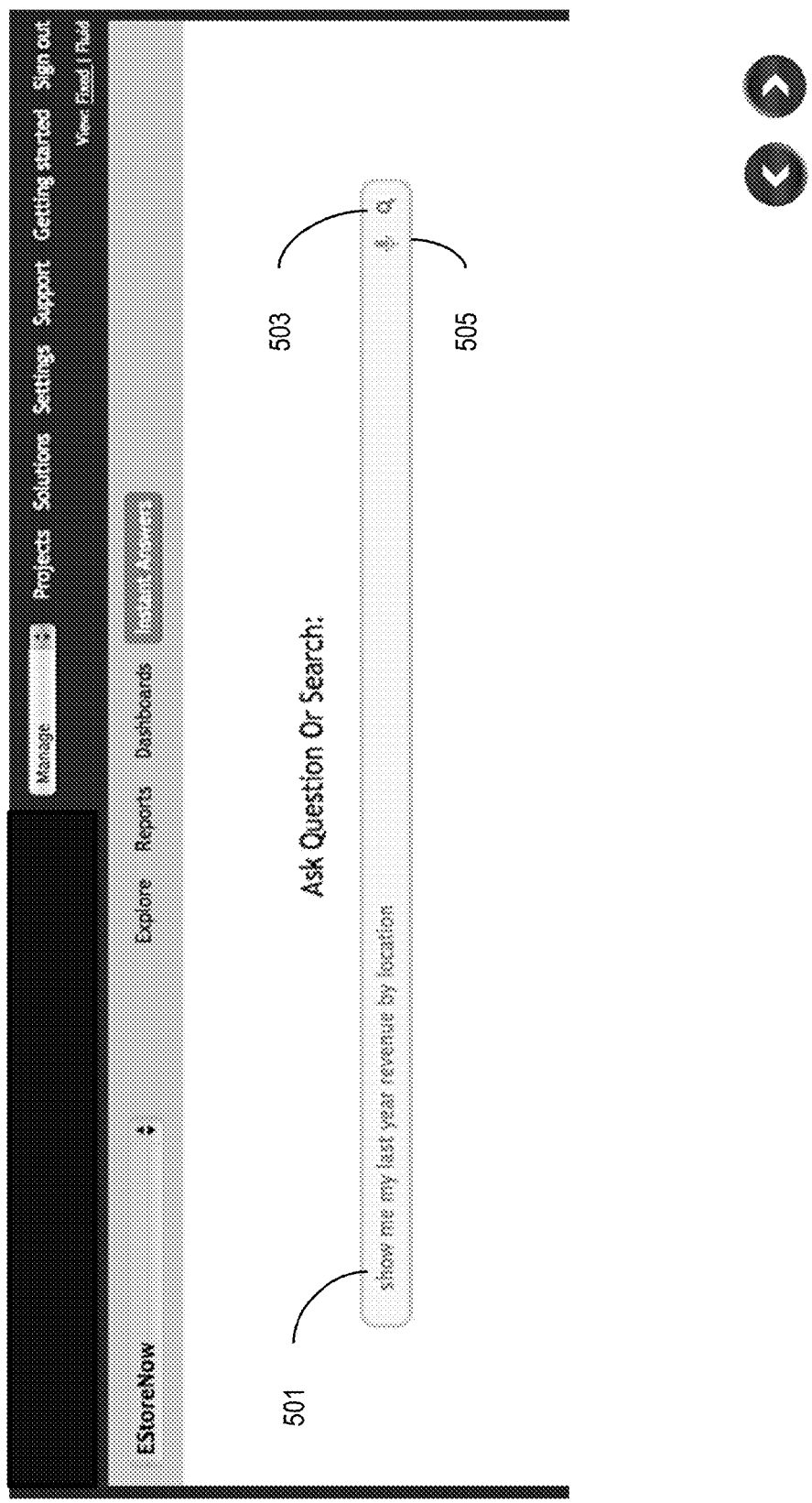
FIG. 5 is a sample display menu for defining queries, according to an embodiment.

FIG. 5 is a sample display menu for defining user queries, according to an embodiment. The user can type a question in window 501 and press the search icon 503. The user can also ask a voice question by speaking into a microphone, by activating the voice input represented by symbol 505.

Figure 6:
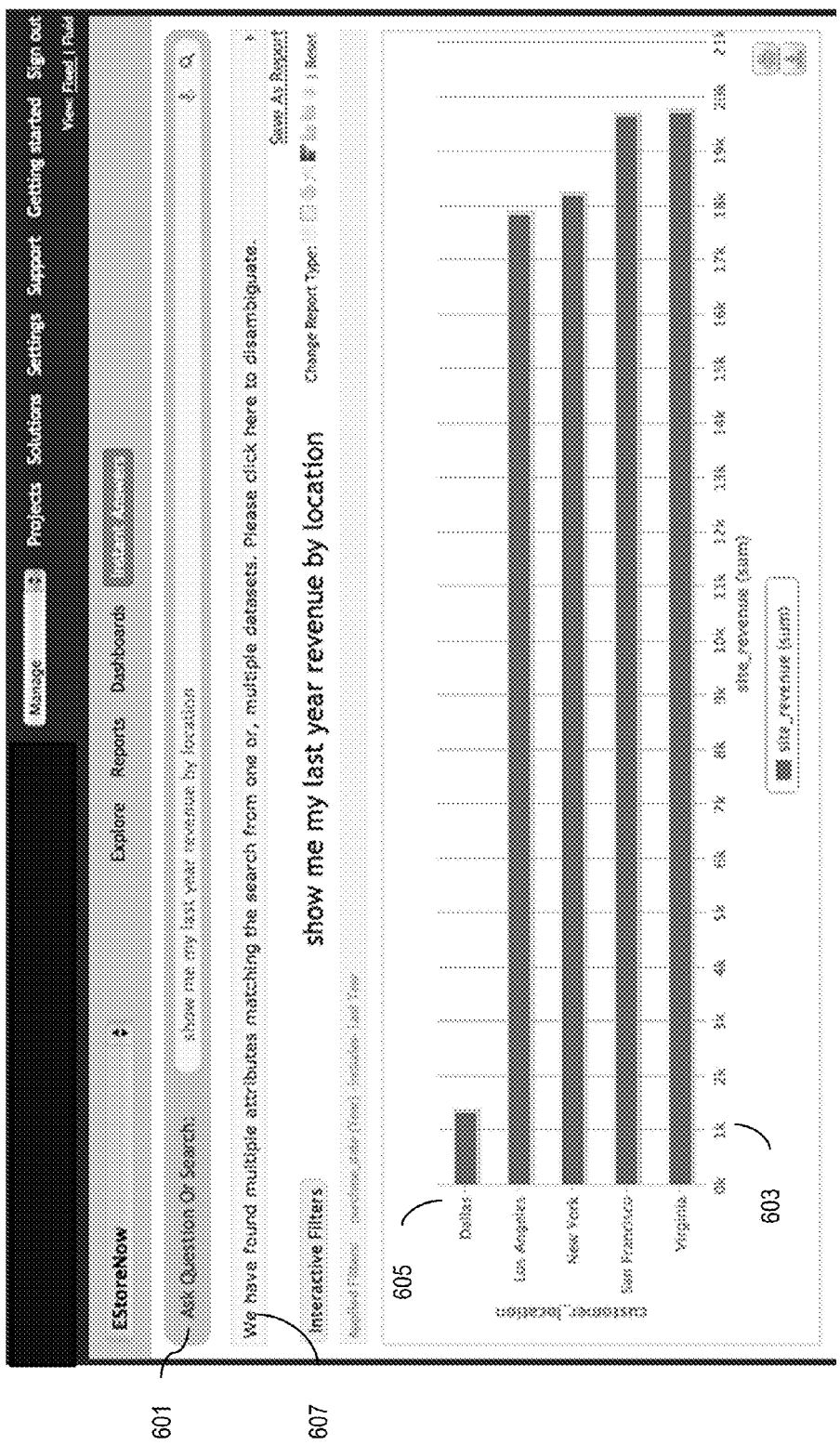
FIG. 6 is a sample report provided by the real-time business intelligence platform, according to an embodiment.

FIG. 6 is a sample report provided by the real-time business intelligence platform, according to an embodiment. The user asked a question 601 "show me my last year revenue by location". The bar chart of FIG. 6 shows the revenue by location by showing revenue values on the horizontal axis 603 and location values on the vertical axis 605. The message 607 indicates that multiple attributes for the search has been found. In some instances, when multiple attributes are found the business intelligence platform 200 can provide an option to the user to allow the user to save the preferences, for example in data store 211. The business intelligence platform 200 can also automatically learn from the user preferences for future searches.

In some instances, if the business intelligence platform 200 fails to find a matching attribute based on the user's question or search query, the business intelligence platform 200 can identify a closest match based on various criteria such as, for example, spell corrections, semantic matching techniques, dictionaries, searching private or public knowledge repositories, third party APIs, rules, heuristics, natural language processing or machine learning algorithms, user preferences, collaborative learning techniques, and/or other techniques to provide relevant suggestions or automatically mapping.

In various instances, the business intelligence platform 200 can define a format of the report (e.g., chart type) based on a default value without user-specified information, or based on a user preference entered by the user during system setup. For example, a default value for a "revenue by location" chart can be set as a bar chart, a line chart, etc. The business intelligence platform 200 can also enable the user to select and update report format while the report is provided. In some instances, the business intelligence platform 200 can learn from user selections and provide subsequent reports based on formats previously selected by the user for similar reports.

Figure 7:
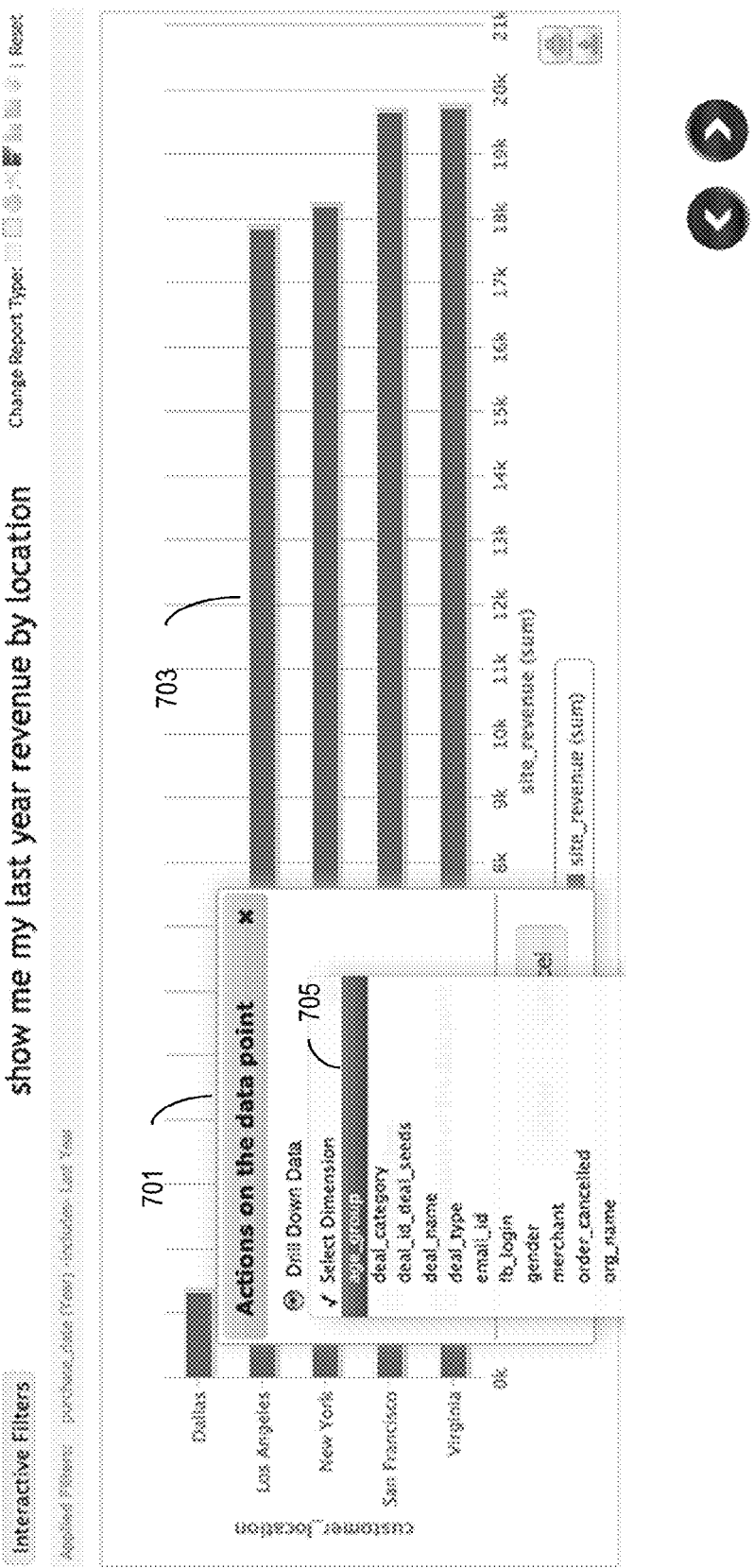
FIG. 7 is a sample display menus for ad-hoc drill down of a real-time business intelligence report, according to an embodiment.

The user can refine the answer by filtering the answer using an ad-hoc drill down as shown in FIG. 7. For example in FIG. 7 the user can select a dimension from an engageable widget triggered by the user clicking on, or moving the mouse over a data point; the engageable widget can include a drill down drop box 701 to be used for interactive filtering of the answer based on, for example, an age-group 705, a deal type, a deal name, etc. The dimensions in the drop box 701 can be the dimensions selected by the user during a setup as discussed with regards to FIG. 4C above. In some instances, the user is allowed to filter results, for example, by appending text to the existing question or search query or by providing a follow-up question or search query.

Figure 8:
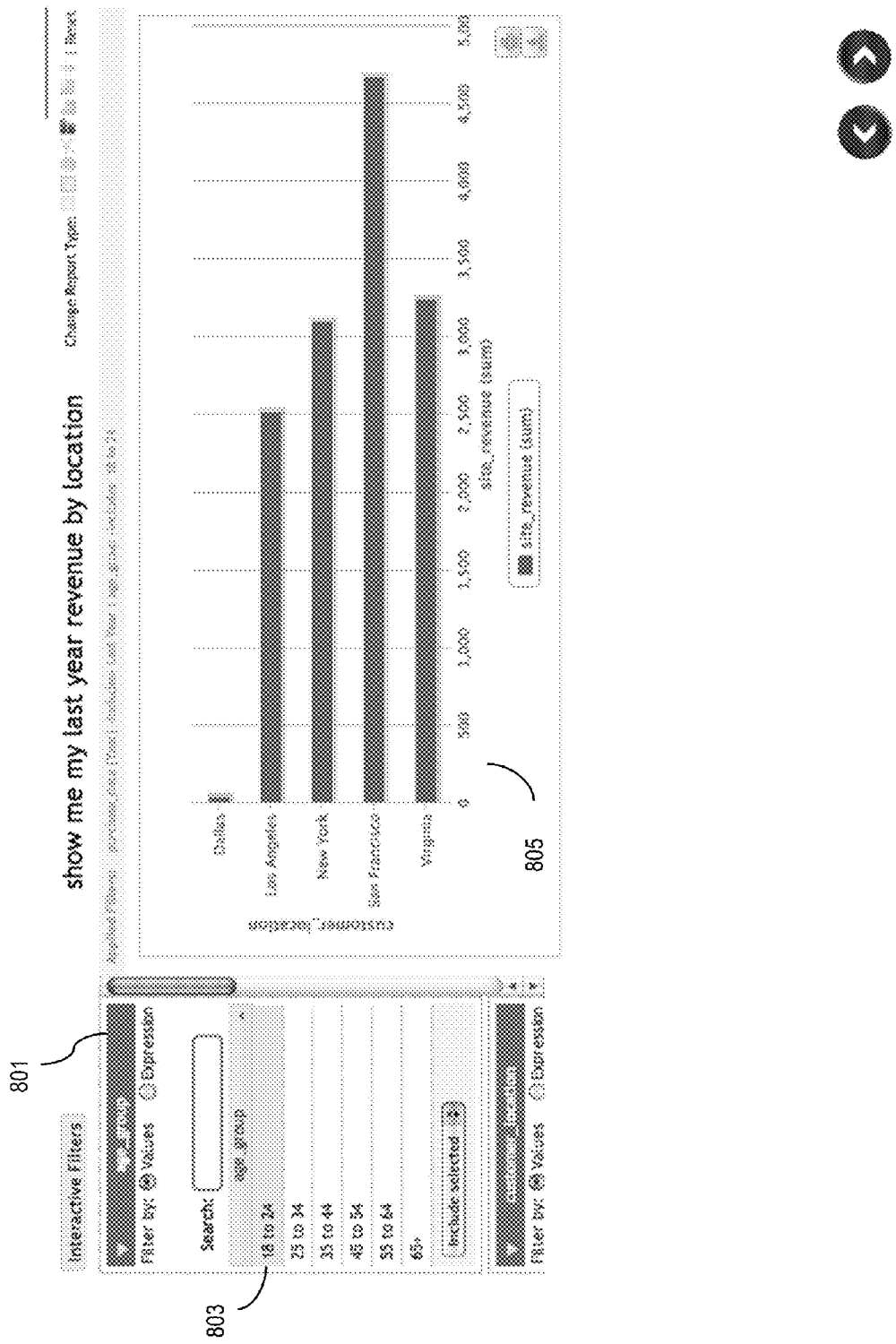
FIG. 8 is a sample display menus for applying interactive filtering on a real-time business intelligence report, according to an embodiment.

FIG. 8 is a sample display menu for applying interactive filtering on a real-time business intelligence report, according to an embodiment. For example, if the user selects the age-group dimension 705 in FIG. 7, in the display of FIG. 8, the age-group table 801 can provide various age selection filters to the user for filtering the query answer 703. The values of age-groups 803 in FIG. 8 can be values of a data field age-group in a data set defined as seen in FIG. 4C. For example, values of the age-group can be "18 to 24", "25 to 34", "35 to 44", etc. and if the user selects the age-group "18 to 24" as an interactive filter (shown as 803), the analytics engine module 209 of the business intelligence platform 200 can update the bar chart 703 and produce the bar chart 805 based on the selected filter, substantially in real-time.

In various instances, the menu for interactive filtering or drill downs can be automatically generated based on the data using certain algorithms or heuristics, or predefined by the user. Furthermore, the results can be saved or bookmarked for future reference or use for example, in the data store 211.

In some instances the business intelligence platform 200 can recommend questions, search queries, reports, dashboards, filters, drill downs, etc., based on the user's prior questions or search queries, the user's interests, or based on trends and what other users are asking on the platform using certain rules or algorithms to calculate affinity or relevance of the recommendations.

Figure 9:
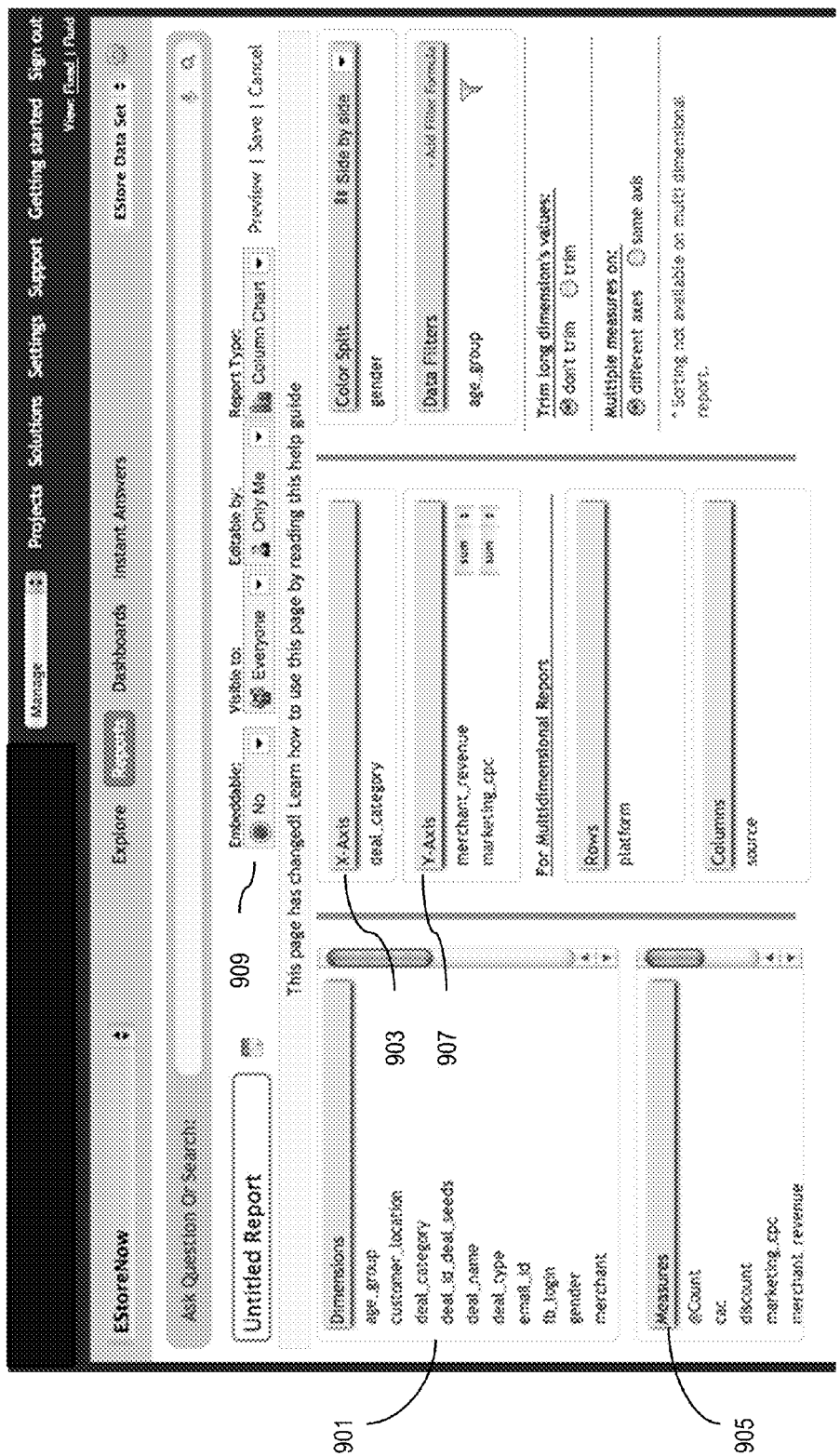
FIG. 9 is a display user interface for manual building of complex reports, according to one embodiment.

FIG. 9 is a display user interface for manual building of complex reports, according to one embodiment. In some instances, the user is enabled to assign one or more dimensions from list 901 to a report axis (e.g., 903). The user is also enabled to assign one or more measures from list 905 to another report axis (e.g., 907). The user can also configure the report by defining embedability, visibility, editability, and type of the report (909).

Figure 10:
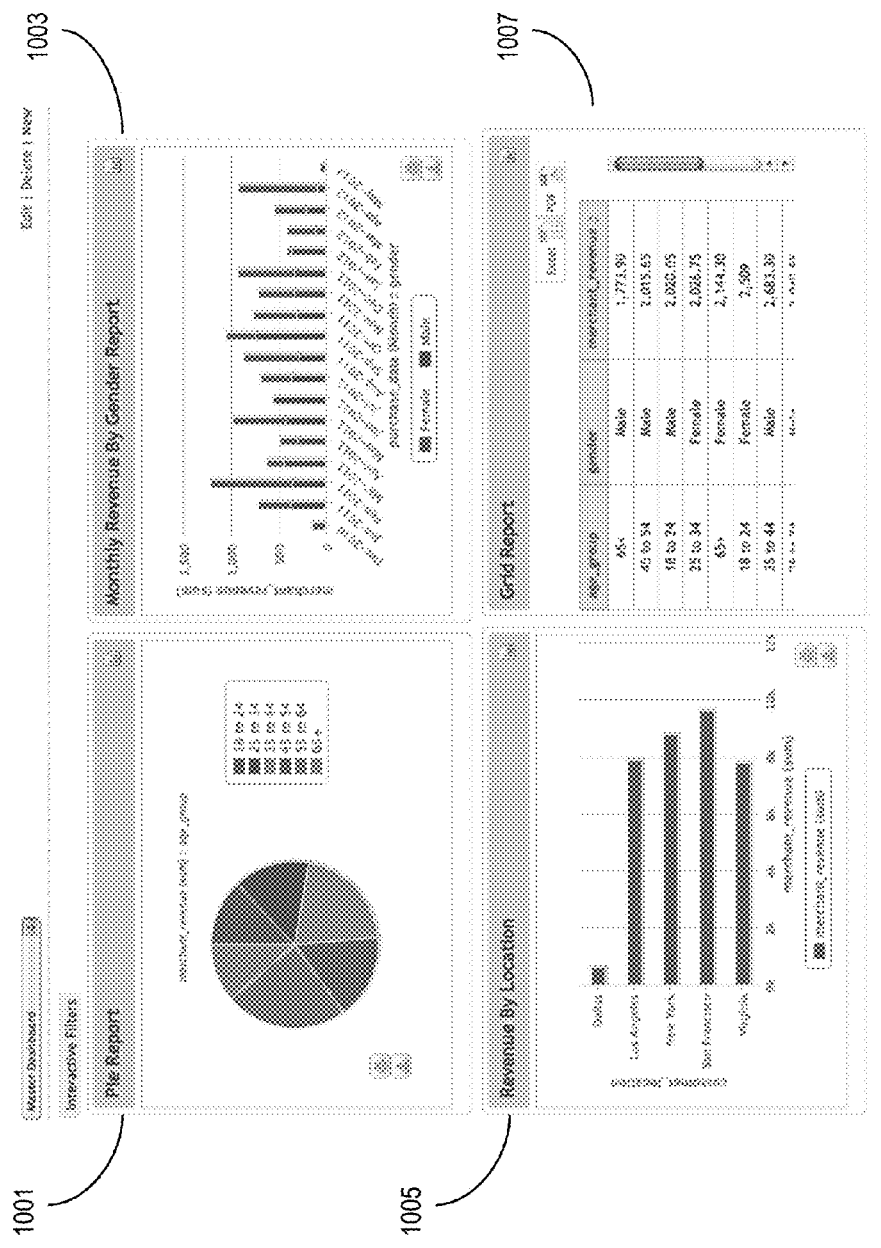
FIG. 10 is a sample display user interface for manual building of dashboards by selecting reports, according to an embodiment.

FIG. 10 is a display user interface for manual building of dashboards by selecting reports, according to an embodiment. For example, a user can select reports to be included in a dashboard from a drop down menu representing a list of available reports. The list of available reports may include default reports, reports previously defined by a user and saved in a storage location (e.g., data store(s) 211), etc. For example, the dashboard of FIG. 10 is built from a pie report 1001, a "monthly revenue by gender" report 1003, a "revenue by location" report 1005, and a grid report 1007.

Figure 11:
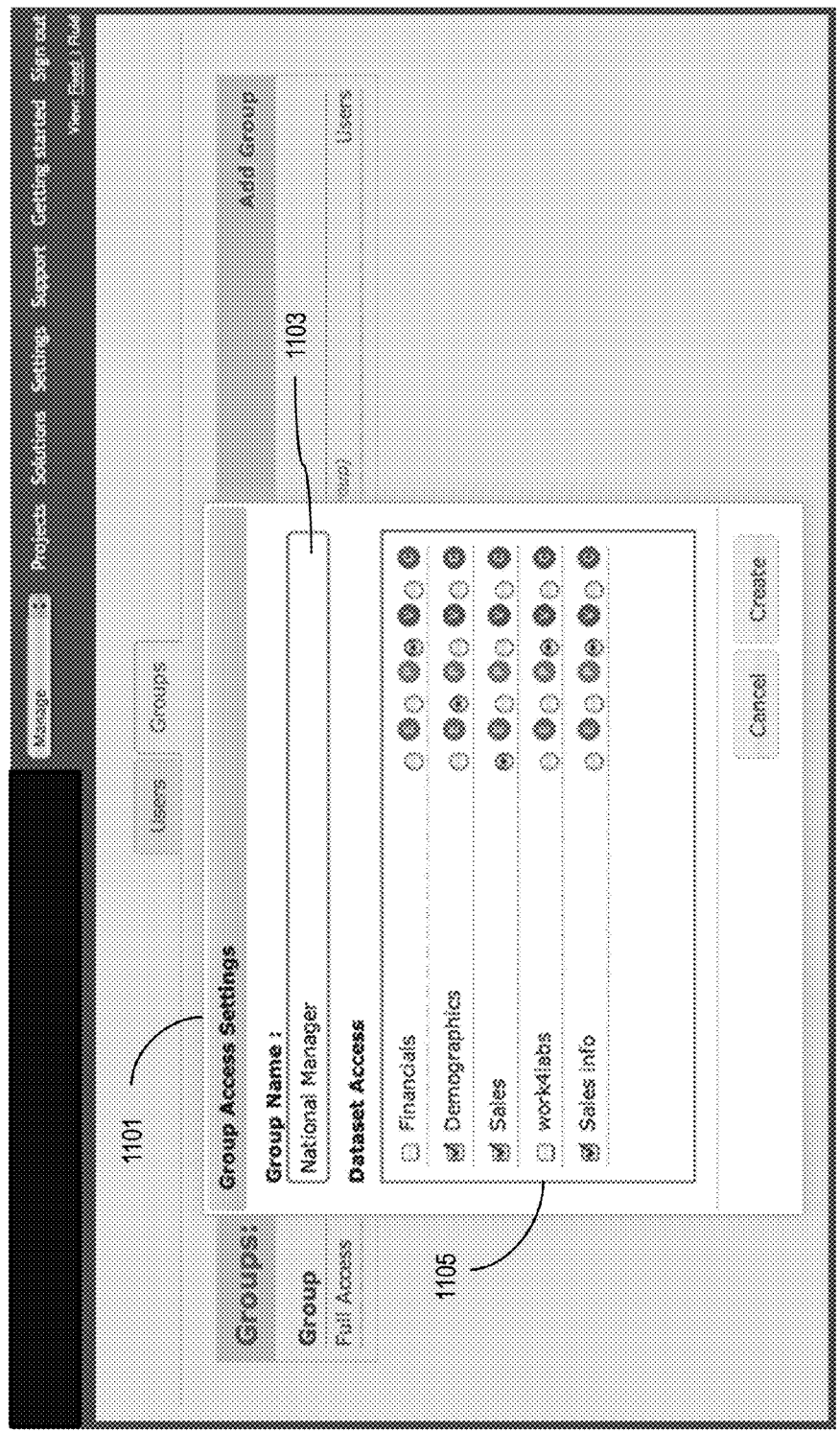
FIG. 11 is a sample display menu for defining role based security groups of users, according to an embodiment.

FIG. 11 is a display menu for defining role-based security groups of users, according to an embodiment. In some instances, an authorized user (e.g., a manager) can use the group access settings 1101 of FIG. 11 to define access rights of various groups of users (1103) for accessing various categories of data sets (e.g., shown in list 1105). In some instances, a user can define categories of data sets and associate data sets with categories at setup time. In other instances, the business intelligence platform 200 can use default categories and associate data sets with categories, for example, based on reports, report types, etc.

Figure 12:
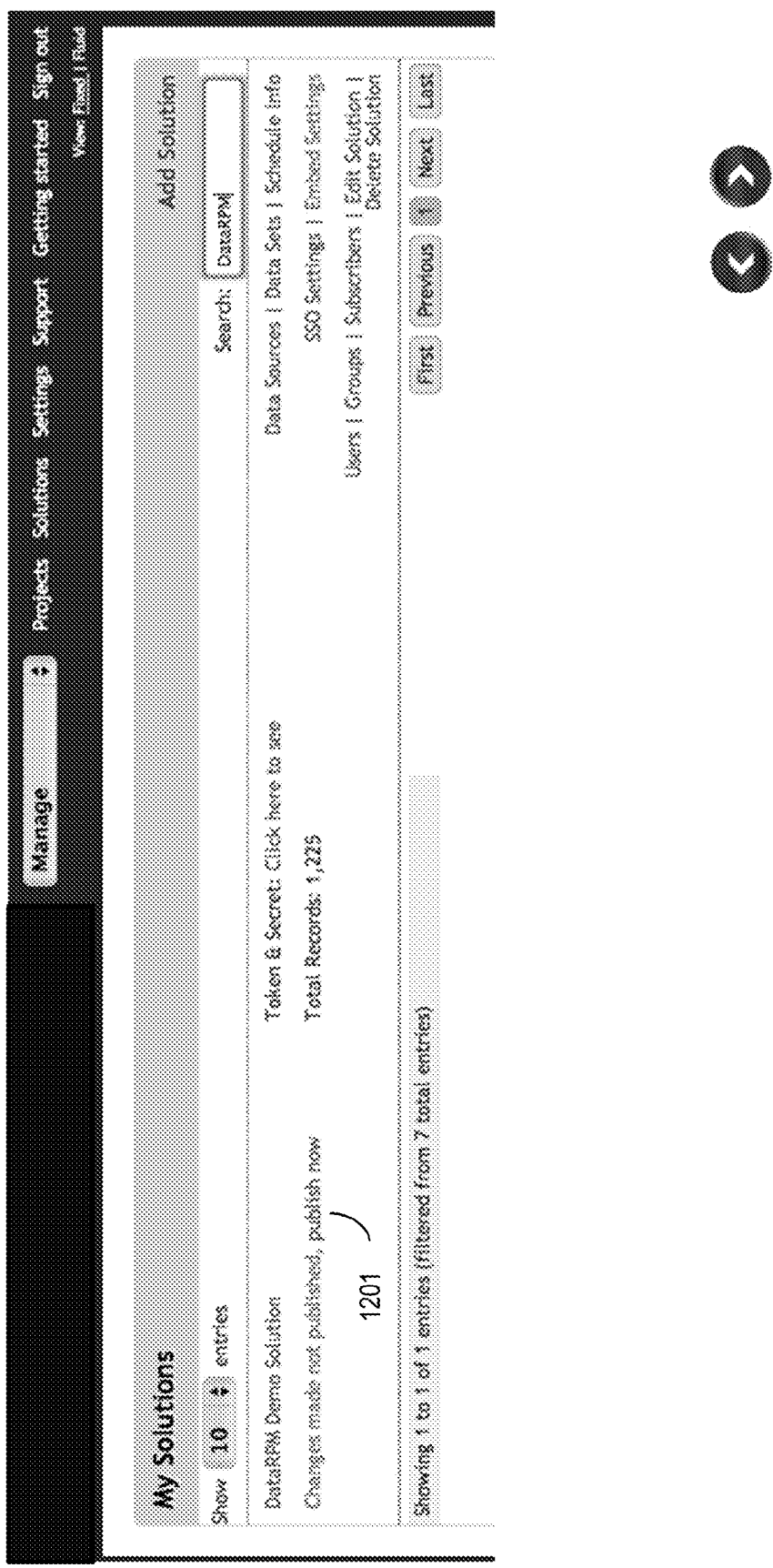
FIG. 12 is a sample display menu for defining multi-tenant solutions, according to an embodiment.

FIG. 12 is a display menu for defining multi-tenant solutions, according to an embodiment. A multi-tenant business intelligence solution can serve multiple customers (tenants), while each customer can be given the ability to customize some parts of the solution such as, for example, color of the user interface (UI), business rules, visualization rules, report formats, etc. For example, a customer can build a business intelligence solution as discussed with regards to FIGS. 4-11 and publish to multiple other customers at click of a publish button (e.g., 1201 in FIG. 12).

In some instances, the business intelligence platform 200 enables users to perform real-time collaboration on the data. The user is enabled to start a discussion on a report, a chart within a report, data points within a chart, etc. The user can add other users into the discussion thread. Users with proper access are allowed to view various discussion threads and participate in discussions by leaving comments. The users mentioned in a discussion thread can receive notifications by email, text message, or other digital communication channels.

In some instances, the business intelligence platform 200 enables users to perform advanced data analysis such as, for example, predictive analytics and forecasting by asking a question. For example, a user may ask "Show me the estimated sales for the next 4 quarters". The business intelligence platform 200 can perform predictive analytics, for example, by executing certain pre-built data mining algorithms, to provide responses to questions asked by the users.

In some instances, the business intelligence platform 200 can include a notification module (not shown in FIG. 2). The notification module can monitor the data based on various user-defined or automated rules and notify the user of any interesting patterns, changes, deviations, etc. in the data. Alerts from the notification module can be communicated to the user in various forms either as notifications via the UI 107, feeds, emails, chat messages, text messages, voice messages, and/or other forms of communication.

It is intended that the systems and methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Python, JavaScript, Perl, PHP, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

In some instances, a query such as, for example, "revenue by location" can be provided by a user of UE 101 and sent by the UE 101 to the business intelligence platform 200 of FIG. 2 via an input signal 221. The natural language processing module 201 of the business intelligence platform 200 can process the query and determine keywords, for example, by approximate string matching. For example, keywords "revenue" and "location" can be determined from the above query. The meta-information lookup module 207 can perform a search on metadata (e.g., location), for example, in search index nodes 215*a*-215*m*. The metadata search can identify data sets 313 that include location and revenue data. Subsequently, the search engine controller module 205 can send a signal to initiate a search by the search engine service(s) 109 of FIG. 1 for revenue values in the identified data sets 313. In some instances, prior to the search initiation, the analytics engine module 209 can send a signal to the UE 101 providing identified data sets 313 to the user and allowing the user to select a subset of data sets 313 for search. The search results can be stored in data store(s) 211. Upon completion of the search, the analytics engine module 209 can analyze search results to, for example, summarize the revenue values based on the location and store the analysis results in data store(s) 211. Upon completion of the data analysis, the report module 217 can use the analysis results to define reports associated with the query response based on the visualization rules 213. The reports can be presented on a UI 107 of UE 101 via an output signal 223.

What is claimed is:
1. A system, comprising:
a processor; and
a memory operatively coupled to the processor, the memory storing processor-readable instructions executable by the processor to:
receive a data analytics request including a user desired data variable via a user interface;
receive, via the user interface, user configured parameters identifying a plurality of user selected data sources and a plurality of user defined data fields for a new data set, a user defined data field from the plurality of user defined data fields representing a logic operation, each data source of the user selected data sources being a separate data source with a data structure schema different from a data structure schema of each of a remaining data source from the user selected data sources;
generate an intermediate query based on the data analytics request;
define an execution path for the intermediate query, the execution path including locations for a plurality of schema-independent distributed index files located on a plurality of distributed server node engines;
transmit, substantially simultaneously, the intermediate query to each distributed service node engine of the plurality of distributed server node engines so as to instruct that distributed server node engine to run the intermediate query, using a schema-independent distributed index file from the plurality of schema-independent distributed index files that is stored at that distributed server node engine;
receive intermediate query results from each distributed service node engine of the plurality of distributed server node engines based on the intermediate query;
form the new data set based at least in part on the intermediate query results and on a relationship between the plurality of user selected data sources and the plurality of user defined data fields;
query the new data set to obtain a first value relating to the user desired data variable;
calculate an output value for the user desired data variable based on the first value and the logic operation; and
send a signal to generate a user interactive graphical representation of the output value of user desired data variable.

2. The system of claim 1, wherein the data analytics request is submitted in a form of a natural language based question.

3. The system of claim 1, wherein the processor-readable instructions are further executable by the processor to verify user access authority to the plurality of user selected data sources based on user login credentials.

4. The system of claim 1, wherein the new data set is defined by aggregating user selected data fields.

5. The system of claim 1, wherein the querying the new data set includes forming a formatted query string based on the data analytics request.

6. The system of claim 1, wherein the user interactive graphical representation is dynamically adjusted upon user submission of query result parameters.

7. The method of claim 1, wherein the query includes a formatted query string.

8. The method of claim 1, wherein the user interactive graphical representation includes an engageable widget triggered to show an option of the user submitted query result parameter.

9. The method of claim 8, wherein the user submitted query result parameter includes a display option of a data point.

10. The system of claim 1, wherein the logic operation includes an equation of the first value.

11. The system of claim 1, wherein the output value for the user desired data variable is not previously stored in the plurality of user selected data sources prior to receipt of the data analytics request.

12. A processor-implemented method, comprising:
receiving a data analytics request including a user desired data variable and user configured parameters including a plurality of data fields, the plurality of data fields to form a query data set via a user interface,
generating an intermediate query based on the data analytics request;
defining an execution path for the intermediate query, the execution path including locations for a plurality of schema-independent distributed index files located on a plurality of distributed server node engines;
transmitting, substantially simultaneously, the intermediate query to each distributed server node engine of the plurality of distributed server node engines so as to instruct that distributed server node engine to run the intermediate query, using a schema-independent distributed index file from the plurality of schema-independent distributed index files that is stored at that distributed server node engine;
receiving intermediate query results from each distributed server node engine of the plurality of distributed server node engines based on the intermediate query;
generating the query data set based on the intermediate query results;
querying the query data set based on the data analytics request, the querying including a logic operation to derive the user desired data variable based on data from the query data set;
obtaining a query result in response to the query;
sending a signal to generate a user interactive graphical representation of the query result;
receiving a user submitted query result parameter via the user interactive graphical representation, the user submitted query result parameter including at least one of (1) a modification to the query data set, (2) a modification to a dimension of the query data set, (3) a modification to a measure associated with data fields of the query data set, or (4) a modification of data set rules associated with the query data set; and
dynamically adjusting the user interactive graphical representation according to the user submitted query result parameter.

13. The method of claim 12, wherein the data analytics request is submitted in a form of a natural language based question.

14. The method of claim 12, wherein the user configured parameters identifies a data source from the plurality of data sources.

15. The method of claim 14, wherein the processor-readable instructions are further executable by the processor to verify user access authority to the data source from the plurality of data sources based on user login credentials.

16. The method of claim 12, wherein the query data set is defined by aggregating the intermediate query results.

17. A non-transitory memory storing a plurality of processor-issuable processing instructions to provide an interaction interface having a plurality of interaction interface mechanisms comprising:
a user configurable interface mechanism including:
a first user input element for a user to submit a data analytics request including a user desired data variable;
a second user input element for a user to submit user configured parameters identifying a plurality of distributed server node engines and a user defined data set, the plurality of distributed server node engines being accessible via a plurality of schema-independent distributed index files located at the plurality of distributed server node engines, the plurality of schema-independent distributed index files generated in response to a submission including the user configured parameters, and accessed based on the user configuration parameters identifying the plurality of distributed server node engines; and an interactive display interface mechanism to display a graphical representation of an output value of the user desired data variable in response to the data analytics request, the output value being calculated via a logic operation on a query result from the user defined data set, the user defined data set being defined based on an intermediate query generated based on the data analytics request and sent to each distributed server node engine of the plurality of distributed server node engines, the interactive display interface mechanism including:

an engageable widget triggered upon a user action, to provide an option for a user to adjust the query result parameter, the engageable widget being one of (1) a dialog box, or (2) a drop-down menu, and being triggered upon one of (1) a mouse click, or (2) a mouse moving over a predetermined data point in the interactive display interface mechanism, the graphical representation being dynamically adjustable based on a user submitted query result parameter via the engageable widget, the user submitted query result parameter including at least one of (1) a modification to the intermediate query results, (2) a modification to a dimension of the intermediate query results, (3) a modification to a measure associated with data fields of the intermediate query results, or (4) a modification of data set rules associated with the intermediate query results.

18. The interaction interface of claim 17, wherein the first user input element is further triggered upon (3) a voice input element.

19. The interaction interface of claim 17, wherein the drop down menu includes of selectable data fields to be dragged to form the user defined data set.

20. The interaction interface of claim 17, wherein the graphical representation includes any of a data plot, a chart, or a diagram.

21. The interaction interface of claim 17, wherein the mouse click results in a selection of a data point on the graphical representation.

22. The interaction interface of claim 17, wherein the user submitted query result parameter includes a display option of a data point.

\* \* \* \* \*